United States Patent
Miyazawa

(10) Patent No.: US 7,873,827 B2
(45) Date of Patent: Jan. 18, 2011

(54) COMMUNICATION SYSTEM, CERTIFICATE UPDATE DEVICE, AND COMMUNICATION DEVICE

(75) Inventor: Masafumi Miyazawa, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 1044 days.

(21) Appl. No.: 11/427,726

(22) Filed: Jun. 29, 2006

(65) Prior Publication Data
US 2007/0005981 A1 Jan. 4, 2007

(30) Foreign Application Priority Data
Jun. 30, 2005 (JP) .............................. 2005-191954

(51) Int. Cl.
*H04L 29/06* (2006.01)
(52) U.S. Cl. ...................................... 713/156; 713/175
(58) Field of Classification Search .................. 713/156, 713/175
See application file for complete search history.

(56) References Cited

U.S. PATENT DOCUMENTS

| 7,478,120 | B1 * | 1/2009 | Zhang ........................ 709/201 |
| 7,512,974 | B2 * | 3/2009 | Callaghan et al. ............. 726/14 |
| 7,765,398 | B2 * | 7/2010 | Novack et al. ............... 713/156 |
| 2002/0059142 | A1 * | 5/2002 | Krause et al. .................. 705/44 |
| 2002/0062438 | A1 * | 5/2002 | Asay et al. ................... 713/157 |
| 2003/0200437 | A1 | 10/2003 | Oishi |
| 2004/0171369 | A1 | 9/2004 | Little et al. |
| 2004/0264697 | A1 * | 12/2004 | Gavrilescu et al. .......... 380/255 |
| 2005/0257058 | A1 * | 11/2005 | Yoshida et al. ............. 713/175 |
| 2007/0011098 | A1 * | 1/2007 | Novack et al. ................ 705/64 |

FOREIGN PATENT DOCUMENTS

| CN | 1427351 A | 12/2001 |
| CN | 1539111 A | 10/2004 |
| JP | 2001-197054 A | 7/2001 |
| JP | 2002-215826 A | 8/2002 |

(Continued)

OTHER PUBLICATIONS

Cisco "public key infrastructure certificate revocation list versus online certificate status protocol", 1992-2004.*

(Continued)

*Primary Examiner*—Gilberto Barron, Jr.
*Assistant Examiner*—Samson Lemma
(74) *Attorney, Agent, or Firm*—Baker Botts L.L.P.

(57) ABSTRACT

There is provided a communication systems in which a public key certificate is easily updated. The administration PC transmits SSL communication request to the print server which is searched by the print server search broadcast. If the server certificate (public key certificate) received from the print server at the time of SSL handshake is determined to be likely to expire, the CSR create request and the CSR parameters are transmitted to the print server. The print server creates CSR based on the received CSR parameters, and transmits the CSR to the administration PC. The administration PC transmits the received CSR to the CA. The CA generates the server certificate based on the received, and transmits the CSR to the administration PC 20. The administration PC transmits the certificate install request and the server certificate to the print server. The print server updates the server certificate by installing the received server certificate.

9 Claims, 18 Drawing Sheets

FOREIGN PATENT DOCUMENTS

| | | |
|---|---|---|
| JP | 2003-244121 A | 8/2003 |
| JP | 2003-273855 A | 9/2003 |
| JP | 2004007512 A | 1/2004 |
| JP | 2004-227451 A | 8/2004 |
| WO | 02101580 A1 | 12/2002 |
| WO | 2004/091167 A1 | 10/2004 |

OTHER PUBLICATIONS

European Patent Office, European Search Report for Related EP Application No. 06253409.4 dated Dec. 11, 2006.

Japanese Patent Office, Notification of Reasons of Rejection in Japanese Patent Application No. 2005-191954 (counterpart to above-captioned U.S. Patent Application), mailed Nov. 27, 2007.

State Intellectual Property Office of P.R. China; Notification of the First Office Action in Chinese Patent Application No. 200610100508.4 (counterpart to the above-captioned U.S. patent application) mailed May 8, 2009.

* cited by examiner

EXAMPLE OF FORMAT OF CSR

Certificate Request:
  Data:
    Version: 0 (0x0) — — — — — — — — — — — — — — — — — — — — — HOST NAME
    Subject: C=jp, ST=xxx, L=yyy, O =zzz, OU=www, CN=printer.xxx.net — HOLDER INFORMATION
    Subject Public Key Info:
      Public Key Algorithm: rsaEncryption
      RSA Public Key: (1024 bit)
        Modulus (1024 bit)
          00:ce:a3:21:53:ce:8f:f3:e9:2d:2e:1c:73:e4:75:
          af:a8:50:9a:c7:7b:91:0a:ce:63:80:22:b5:1b:fa:
          c6:8a:ea:22:8a:0b:f4:7d:5f:e1:00:74:90:05:87:
          20:99:eb:ab:1f:d6:92:3b:ff:42:25:4d:ce:4d:f9:
          51:cd:43:d2:8b:3a:4a:cb:71:71:52:84:ea:e9:b4:
          2b:79:c2:96:3d:86:b6:30:56:8e:48:24:25:50:48:
          3a:58:b6:25:77:38:24:df:79:45:8c:27:37:b7:26:
          be:54:ab:3f:8e:0e:48:43:9f:86:8f:8a:cd:a7:28:
          e8:f6:32:47:e7:84:1d:ef:fd
        Exponent: 65537 (0x10001) — — — — — — — — — — — — — — — — PUBLIC KEY
    Attributes:
      a0:00 — — — — — — — — — — — — — — — — — — — — — — — — — EXTENDED AREA
  Signature Algorithm: mb5WithRSAEncryption
    0f:99:0a:25:51:d9:ad:02:e0:ea:95:b5:59:0c:35:27:9f:01:
    ff:d9:6d:36:2b:d3:24:39:3b:64:c9:07:3c:e2:19:65:70:a0:
    e6:52:56:99:b8:1d:35:97:67:9d:d4:8f:47:55:2a:4a:ad:c2:
    3a:be:b7:4c:69:ee:3f:50:4c:eb:af:07:c0:43:35:5d:35:c1:
    8f:4a:65:ad:90:88:ab:d7:3f:eb:95:0a:9f:c0:32:5b:54:c9: — DIGITAL SIGNATURE
    f9:e8:c2:b7:8d:4e:bc:02:b5:2f:d7:1d:7c:1a:3b:42:ab:7e:   (BY PRIVATE KEY OF CA)
    b7:ec:71:bc:e8:fa:11:4e:45:cd:07:ba:fc:f7:03:6f:fc:00:
    7a:07

FIG. 9

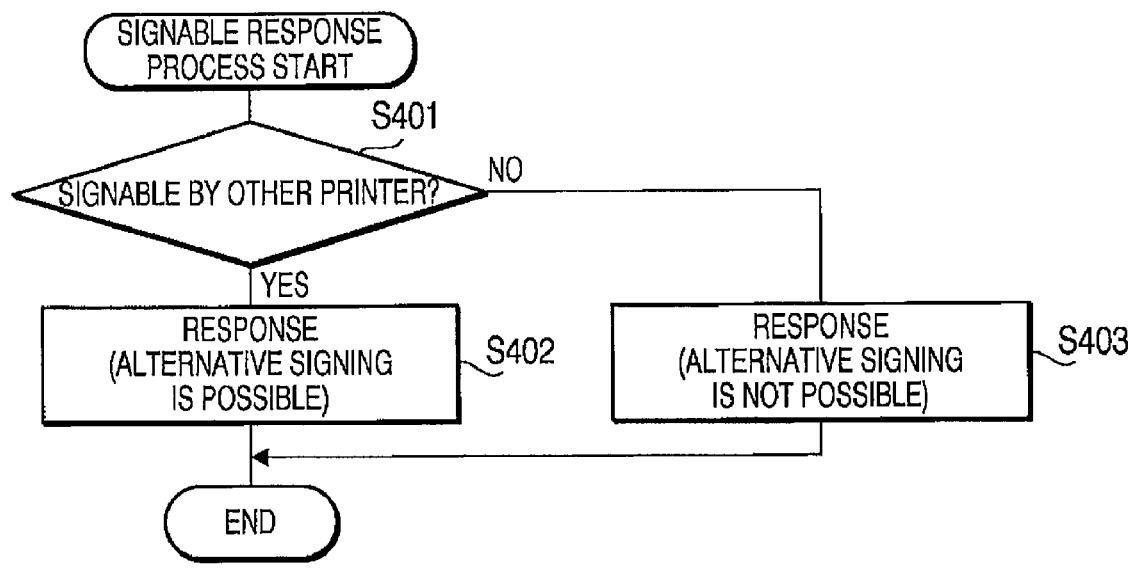
FIG.16
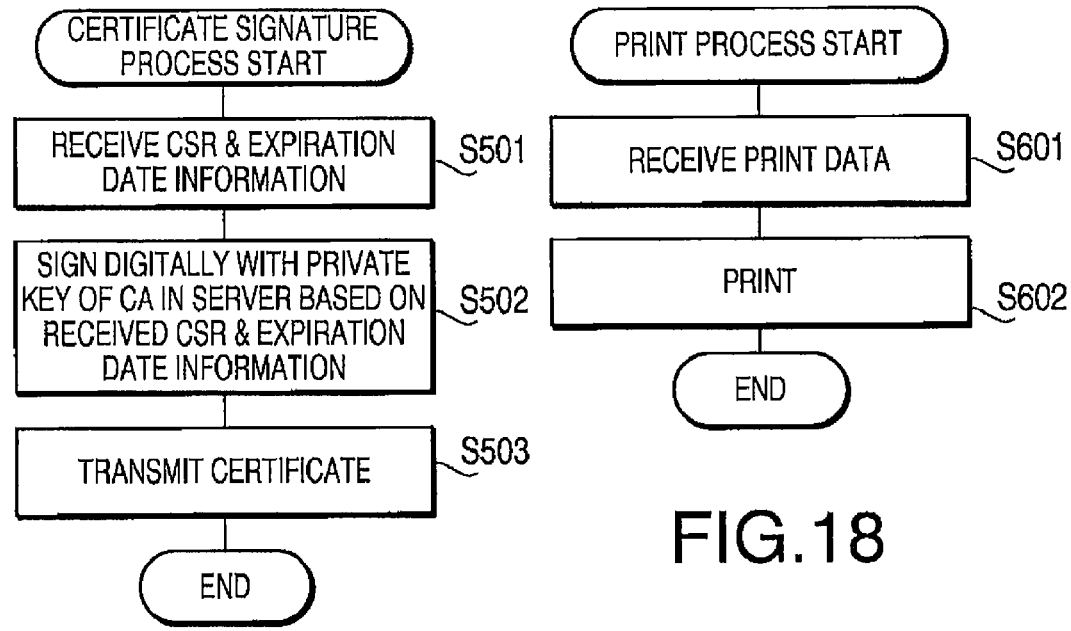
FIG.17
FIG.18

COMMUNICATION SYSTEM, CERTIFICATE UPDATE DEVICE, AND COMMUNICATION DEVICE

CROSS-REFERENCE TO RELATED APPLICATION

This application claims priority under 35 U.S.C. §119 from Japanese Patent Application No. 2005-191954, filed on Jun. 30, 2005. The entire subject matter of the application is incorporated herein by reference.

BACKGROUND OF THE INVENTION

1. Technical Field

The present invention relates to a communication system including a communication device that is verified an identify by an authentication device with electronically signed public key certificate.

2. Description of Related Art

Recently, as network communication use have expanded drastically, it is critical to ensure the security in communication. Electronic signature and electronic authentication based on the technology of the public key infrastructure (PKI) have been widely used.

Electronic signature using public key method is generated by encrypting a hash value object data using a private key, so a public key corresponding to the private key is necessary to verify the electronic signature. Because the public key itself does not contain information of the key holder, a reliable third-party issues a public key certificate which attests that the public key contained in the certificate belongs to the person noted in the certificate. Here, the reliable third-party that issues a certificate is called a certificate authority (CA).

For example, a communication system that is configured so that IP address and public key certificate of a host which is a communication device in a LAN are frequently changed (for each communication partner, for each session, or for each communication packet transmission) is disclosed in Japanese Patent Application Provisional Publication No. P2004-7512A. In the communication system, a CA that issues a public key certificate is set as a node in the LAN, and host user name, password and public key are register in the CA. When the CA is requested by the host to issue a public key certificate, by verifying the host based on information registered in the CA, host spoofing is prevented.

In a communication device of which an identity is verified with a public key certificate electronically signed by CA, if validity period of a public key certificate expires or the public key certificate cannot be used because content to be verified (for example, IP address or host name that is identification information of the key holder) is changed, it is necessary to request the CA to re-issue the public key certificate. However, because public key certificate of the communication device is already revoked, there is a problem that complicated process is necessary to make the CA verify the communication device (similar process of request for issue of a new public key certificate)

If the system is configured so that user name, password and public key of the communication device are registered in the CA as described in Japanese Patent Application Provisional Publication No. P2004-7512A, it is possible to make the CA attest the communication device after a public key certificate is revoked. However, in such a system, a particularly configured CA that attest the host based on information of the user name, etc., should be used, and the information of the user name, etc. are registered in the CA beforehand. Such a system does not allow convenience to a user.

SUMMARY OF THE INVENTION

Aspects of the invention are advantageous in that there is provided a communication system in which a public key certificate is easily updated.

BRIEF DESCRIPTION OF THE ACCOMPANYING DRAWINGS

FIG. 9 is an illustration which shows a format example of CSR.

FIG. 16 is a flow diagram which shows the signable response process that the CPU of the print server executes.

FIG. 17 is a flow diagram which shows the certificate signature process that the CPU of the print server executes.

FIG. 18 is a flow diagram which shows the print process that the CPU of the print server executes.

DESCRIPTION

General Overview

Figure 1:
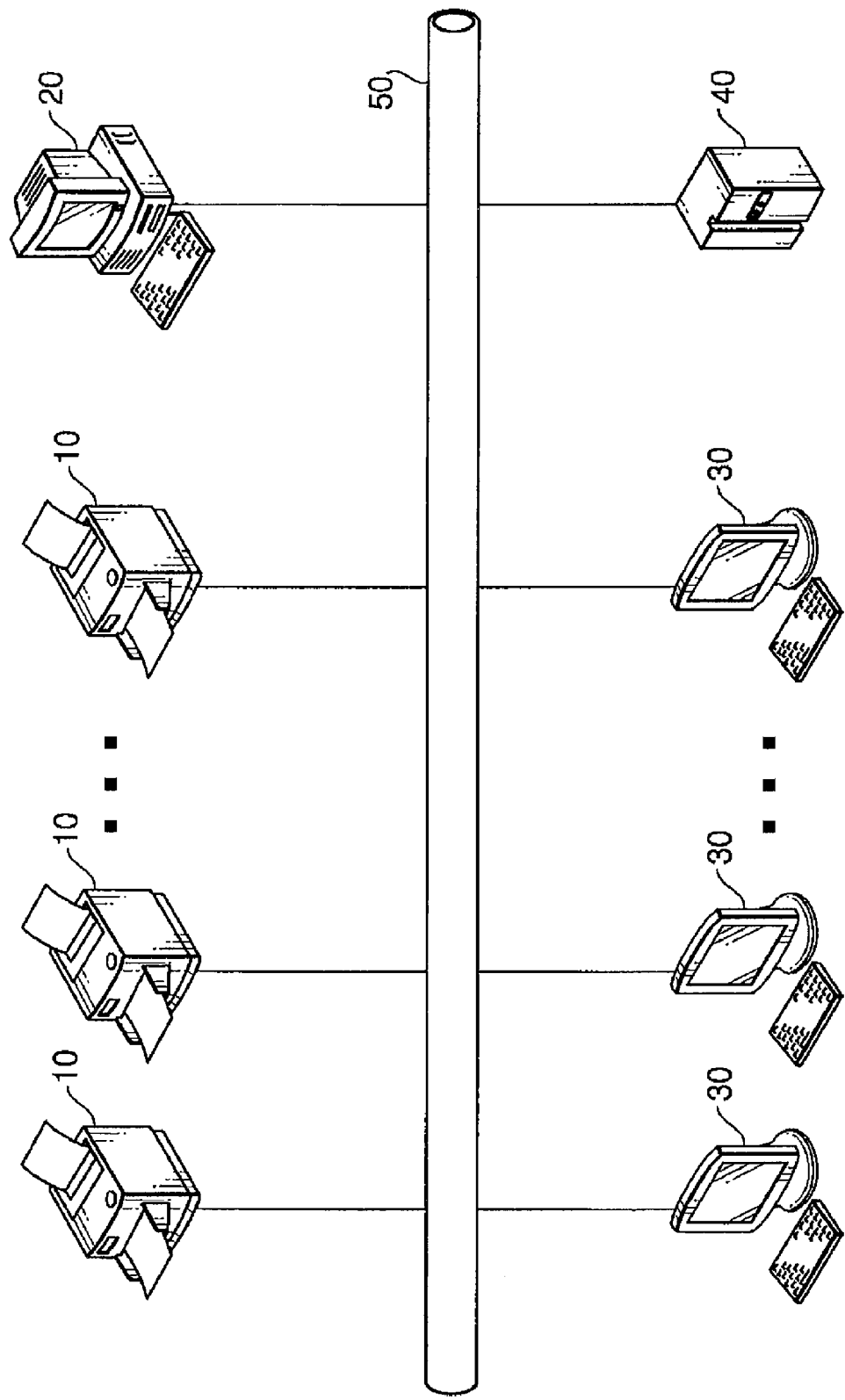
FIG. 1 shows configuration of a network print system.

It is noted that various connections are set forth between elements in the following description. It is noted that these connections in general and unless specified otherwise, may be direct or indirect and that this specification is not intended to be limiting in this respect. Aspects of the invention may be implemented in computer software as programs storable on computer-readable media including but not limited to RAMs, ROMs, flash memory, EEPROMs, CD-media, DVD-media, temporary storage, hard disk drives, floppy drives, permanent storage, and the like.

According to aspects of the invention, there is provided a communication system which comprises a communication device that is verified an identity of the communication device by public key certificate with an electronic signature of an authentication device. The communication system comprises a certificate update unit, and the certificate update unit executes the process to make the authentication device update the public key certificate of the communication device before a public key certificate is revoked.

Therefore, in the communication system of the present invention, when the process to make the authentication device update the public key certificate is executed, the public key certificate of the communication device is valid. As a result, the public key certificate can be easily updated. That is, in the case that the authentication device is requested to re-sign (re-issue) the public key certificate after the public key certificate is revoked, the identity of the communication device cannot be verified anymore, and a complicated process is necessary to make the authentication device verify the communication device. On the other hand, as for the communication system according to aspects of the present invention, because the public key certificate is updated in a situation that the public key certificate verifies the identity, the public key certificate can be easily updated. A particularly configured authentication device describe in Japanese Patent Application Provisional Publication No. P2004-7512A is not necessary to the communication system according to aspects of the invention, and widely known certificate authority may be utilized as an authentication device.

One of the reasons that the public key certificate of the communication device is revoked is expiration of the valid period of the public key certificate. Optionally, the certificate update unit may refer to the validity period of the public key certificate of the communication device, and may update the public key certificate within a predetermined period before the expiration date by making the authentication device to execute an update process so as to extend the validity period of the public key certificate. Then, the communication system can prevent a situation where a validity period of the public key certificate expires while an administrator of the communication device is not aware of the expiration.

In the case that the public key certificate of the communication device contains identification information of the communication device (for example, IP address or host name), if the own identification information of the communication device is changed, because a holder information contained the public key certificate is not identical with actual identification information, the public key certificate may be revoked.

Optionally, the communication system may comprise a information change unit that changes identification information of the communication device, and the certificate update unit executes a process to make the authentication device to update the public key certificate so that the holder information is changed to be new identification information before the information change unit makes new identification information of the communication device. The communication system according to aspects of the invention can prevent a situation where the public key certificate is revoked, because the identification information of the communication device is changed.

Further optionally, the communication system may have a plurality of the above described communication devices and an administration device that is configured to be communicatable with each of the plurality of the communication devices. Then in the communication system, the certificate update unit is comprised in the administration device, and executes a process to make the authentication device update the public key certificate of the plurality of the communication devices. Therefore, the communication system according to aspects of the invention enables public key certificates of a plurality of communication device to be managed by the common administration device effectively.

However, in such a communication system, if processes by the administration device are not executed due to some reasons, the public key certificate of the communication device may be revoked.

Optionally, the communication system may have an alternate update request unit that executes a process to request other communication device of which identity is verified by the authentication device for updating the public key certificate before a public key certificate is revoked when it is determined that a process to make the authentication device to update the public key certificate of the communication device is not executed by the administration device.

That is, each communication device of the communication system is configured to execute a process to update a public key certificate in response to a request from other communication device. When it is determined that a process to make the authentication device to update the public key certificate of the communication device is not executed by the administration device, the communication device requests other communication device of which identity is verified by the authentication device for updating the public key certificate.

According the communication system configured described above, the communication device of which the public key certificate is updated by the other communication device is verified the identity indirectly by the electronic signature of the communication device that the authentication device verifies. Therefore, even when the process to make the authentication device update the public key certificate is not executed by the administration device (for example, in the case that the administration device malfunctions, or the administrator forgets to do the operation to execute the process), the communication system according to aspects of the invention can prevent the situation where the public key certificate is immediately revoked.

Optionally, the certificate update unit of the administration device may execute a process to make the authentication device update the public key certificate when it is determined that the public key certificate of the communication device is not electronically signed by the authentication device.

According the communication system configured described above, the public key certificate issued by the communication device while the administration device does not execute processes is updated to a new public key certificate issued by the authentication device after the administration device recovers to execute the processes. Therefore, according to aspects of the invention, high reliability of the communication device can be achieved.

Further optionally, the certificate update unit may execute a process to make the authentication device update the public key certificate of the communication device before a public key certificate is revoked. Here, the certificate update unit is used in the communication system comprising a communication device of which identity is verified by a public key certificate electronically signed by an authentication device.

Therefore, in the communication system which comprises the certificate update device according to aspects of the present invention, when the process to make the authentication device update the public key certificate is executed, the public key certificate of the communication device is valid. As a result, the public key certificate can be easily updated.

According to aspects of the invention, there is provided a certificate update program that make a computer which is used in the communication system comprising the communication device of which identity is verified by the public key certificate electronically signed by the authentication device function as the certificate update unit that executes the process to make the authentication device update the public key certificate of the communication device before the public key certificate is revoked.

Therefore, by using the certificate update program according to aspects of the invention, a computer can function as a certificate update unit, and the above described effect is achieved.

According to aspects of the invention, there is provided a communication device which is used in a communication system that comprises a plurality of communication devices that are verified an identify by an authentication device with an electronically signed public key certificate, and an administration device that is configured to be communicatable with each of the plurality of communication devices, and executes a process to make the authentication device update the public key certificate of the communication device before a public key certificate is revoked.

In such a communication system, when the process to make the authentication device update the public key certificate is executed, the public key certificate of the communication device is valid. As a result, the public key certificate can be easily updated. Further, according to aspects of the invention, public key certificates of a plurality of communication device can be managed by the common administration device effectively.

The alternate update request unit executes a process to request other communication device for updating the public key certificate before the public key certificate is revoked when it is determined that the process to make the authentication device to update the public key certificate of the communication device is not executed by the administration device. Further, the alternate update process unit executes a process to update the public key certificate with an electronic signature of the communication device when the communication device receives a request to update the public key certificate from other communication device.

That is, the communication device is configured to execute a process to update a public key certificate in response to a request from other communication device. When it is determined that the process to make the authentication device to update the public key certificate of the communication device is not executed by the administration device, the communication device requests other communication device of which identity is verified by the authentication device for updating the public key certificate According the communication system configured described above, the communication device of which the public key certificate is updated by the other communication device is verified the identity indirectly by the electronic signature of the communication device that the authentication device verifies. Therefore, even when the process to make the authentication device update the public key certificate is not executed by the administration device (for example, in the case that the administration device malfunctions, or the administrator forgets to do the operation to execute the process), the communication system according to aspects of the invention can prevent the situation where the public key certificate is immediately revoked.

According to aspects of the invention, there is provided an alternate update program which makes a computer function as a communication system that comprises a plurality of communication devices that are verified an identify by an authentication device with electronically signed public key certificate, and an administration device that is configured to be communicatable with each of the plurality of communication devices, and makes the computer function as an alternate update request unit executes a process to request other communication device for updating the public key certificate before the public key certificate is revoked when it is determined that the process to make the authentication device to update the public key certificate of the communication device is not executed by the administration device and as an alternate update process unit that executes a process to update the public key certificate with an electronic signature of the communication device when the communication device receives a request to update a public key certificate from other communication device.

Therefore, by using the alternate update program according to aspects of the invention, a computer can function as a communication device, and the above described effect is achieved.

In addition, a program may be computer software stored on computer-readable media including magnetic disk such as flexible disk, optical disk, semiconductor memory, etc.

EXAMPLES

Hereinafter, examples according to the invention will be described with reference to the accompanying drawings.

1. Overall Configuration of the System

FIG. 1 shows configuration of a network print system which is a communication system as an example of the present invention.

As shown in FIG. 1, the network print system is configured so that a plurality of print servers 10, a personal computer for administration PC (hereinafter referred to "administration PC 20"), a plurality of client personal computers hereinafter referred to "client PC 30"), and CA 40 are connected to LAN 50, and communicatable with each other via LAN 50. In the network print system according to the example, the administration PC 20 and CA 40 are configured so as to be able to communicate with each other securely.

2. Configuration of Each Device

Hereinafter, configuration of each device of the network print system is described.

2.1 Configuration of a Print Server

Figure 2:
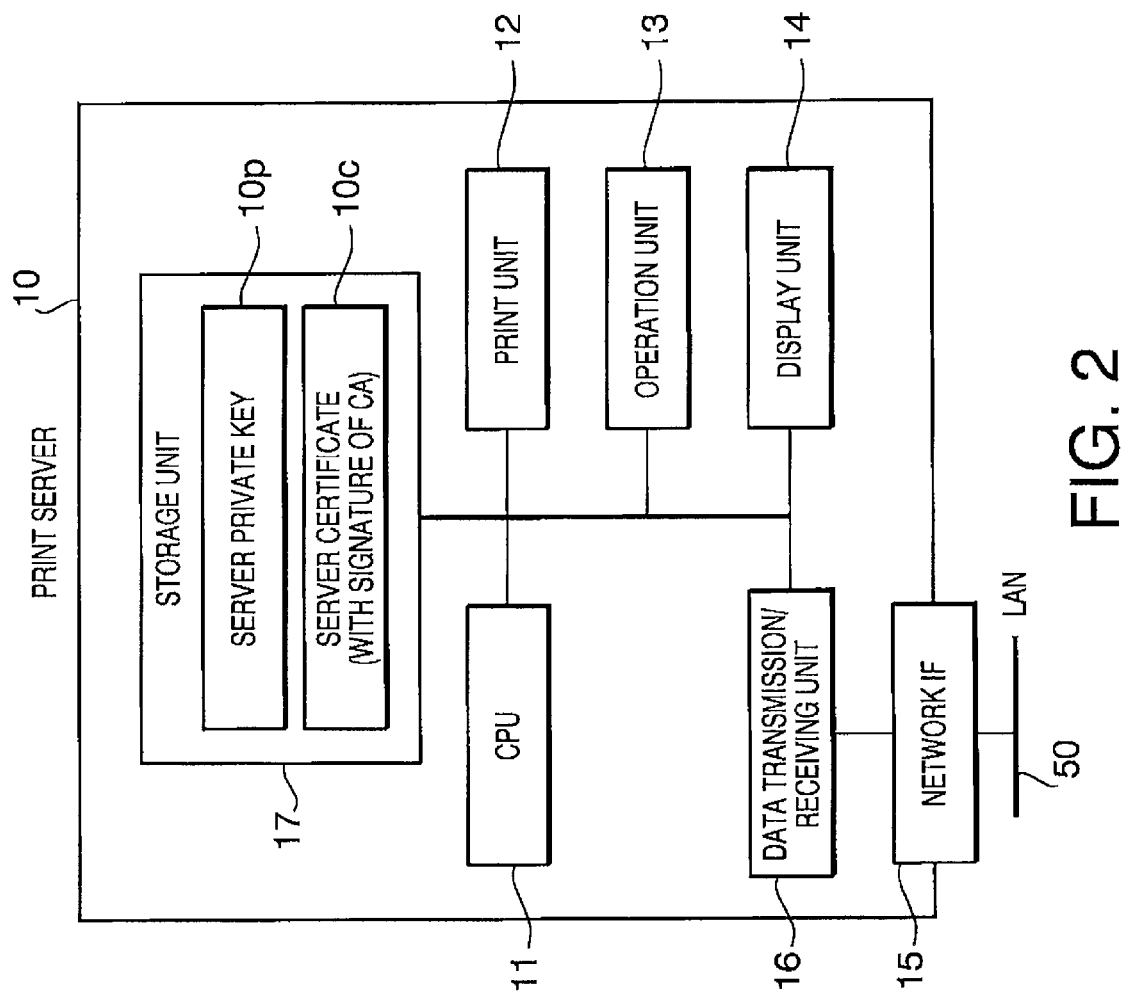
FIG. 2 is a block diagram which shows configuration of the print server.

FIG. 2 is a block diagram which shows configuration of the print server 10.

The print server 10 is a device which functions as so called a network printer which receives print data from the client PC 30 that is configured to be communicatable with the server via LAN 50, and prints an image represented by the print data. As shown in FIG. 2, the print server 10 is provided with a CPU 11, a print unit 12, an operation unit 13, a display unit 14, a network interface (network IF) 15, a data transmission/receiving unit 16 and a storage unit 17.

The CPU 11 controls each one of the units which configure the print server 10 by performing various arithmetic processing. The print unit 12 prints image on record medium (print papers, etc.) based on commands from the CPU 11. Printing images on record medium is done with a recording method such as a laser transfer method or inkjet printing method The operation unit 13 comprises a operation panel as a user interface and receives the user's command through the operation panel. The display unit 14 is provided with a liquid crystal display, and displays various information to the user as visually recognizable images.

The network interface 15 transmits and receives data through a communication cable (LAN cable) which is connected to the interface. The data transmission/receiving unit 16 transmits data output from the CPU 11 via the network interface 15, and outputs data received via the network interface 15 to the CPU 11.

Figure 3:
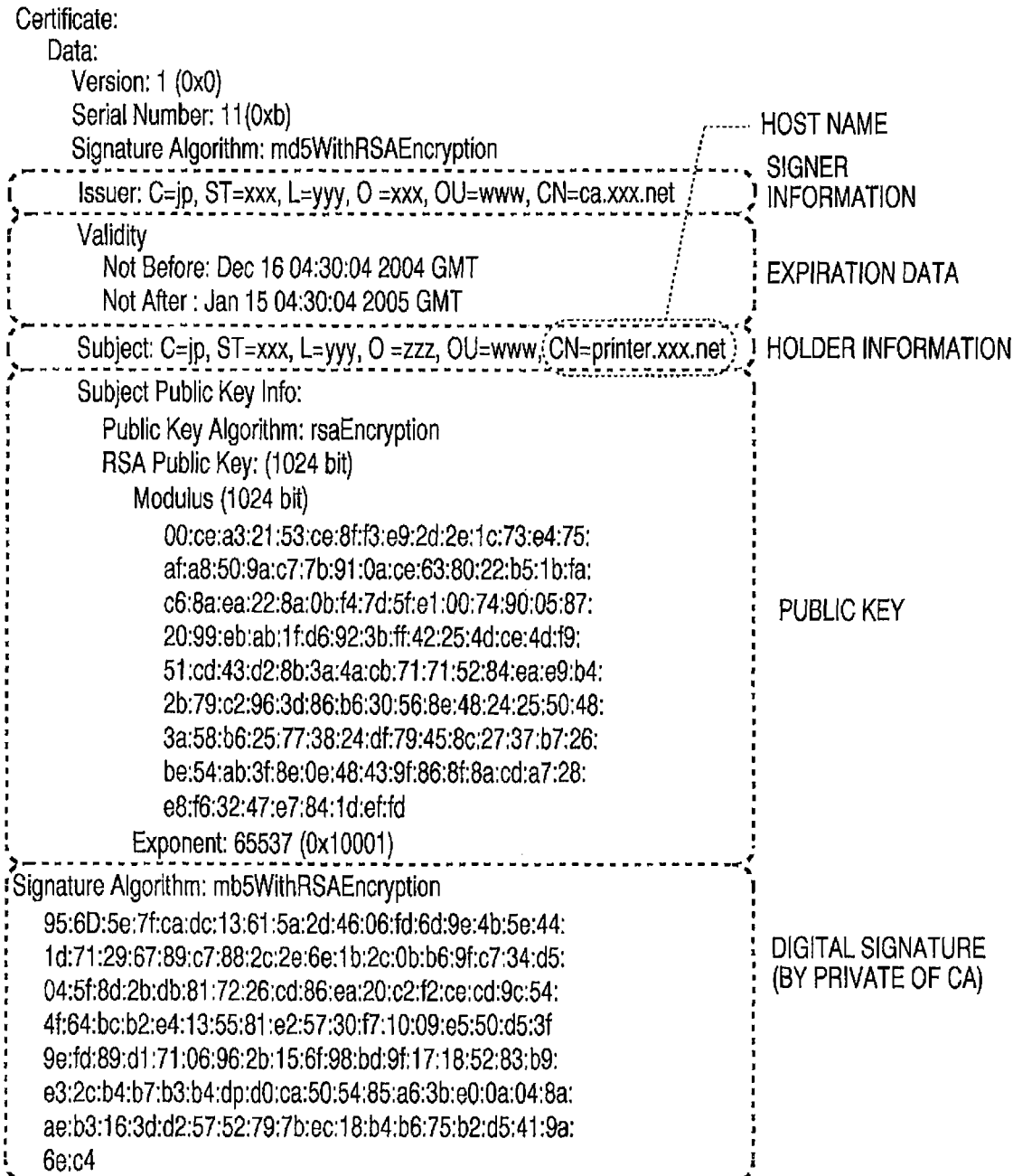
FIG. 3 is an illustration which shows a format example of the public key certificate.

The storage unit 17 is to store various information, and is configured with a ROM, a RAM, etc. The storage unit 17 stores a private key of the print server 10 (hereinafter referred to the "server private key 10$p$"), an electronic certificate to verify an identity of the print server 10 (hereinafter referred to the "server certificate 10$c$"). The server certificate 10$c$ is a public key certificate which verifies that the server private key 10$p$ corresponds to identification information, such as IP address a host name, FQDN (Fully Qualified Domain Name) of the print server 10. The server certificate 10$c$ is electronically signed by the CA 40 in principle with the private key 40$p$ described below except in the case that the print server does alternative signing (signing by a print server 10 in the LAN 50 instead of the CA 40). As shown in an example of format of the public key certificate in FIG. 3, the network print system uses the public key certificate containing signer information, validity period, holder information (common name), public key and electronic signature (digital signature). Here, an actual public key certificate is not text data. However, the certificate is shown as text data in FIG. 3 for convenience of explanation.

The storage unit storage unit 17 stores a program to make CPU 11 execute various processes shown in FIGS. 13-18.

2.2 Configuration of Administration PC

Figure 4:
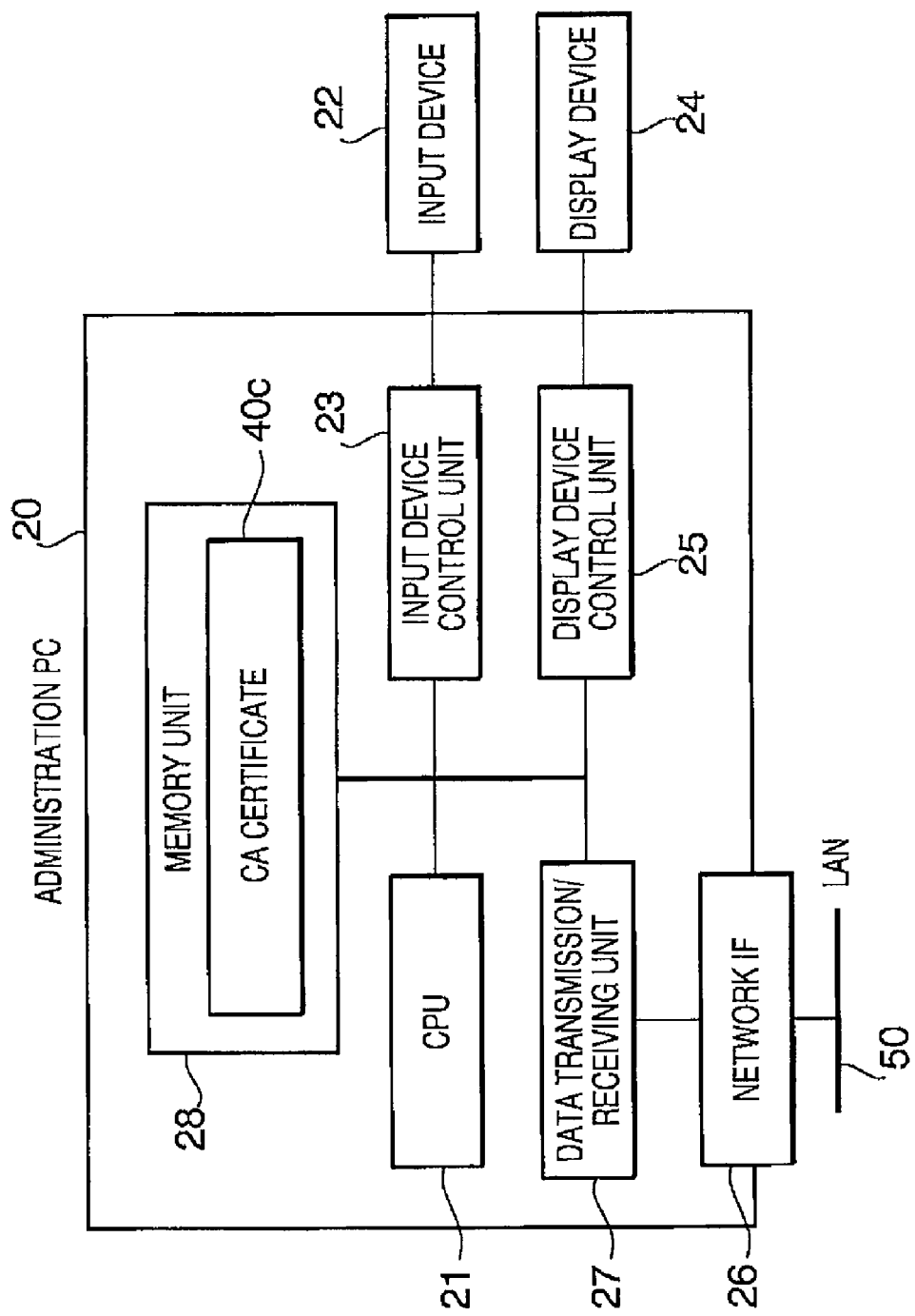
FIG. 4 is a block diagram which shows configuration of the administration PC.

FIG. 4 is a block diagram which shows configuration of the administration PC 20.

The administration PC 20 is a computer which is used by an administrator of the network print system (multipurpose personal computer in the example). As can be seen in FIG. 4, the administration PC 20 comprises a CPU 21, an input device 22, an input device control unit 23, a display device 24, a display device control unit 25, a network interface (network IF) 26, an data transmission/receiving unit 27 and a storage unit 28.

The CPU 21 controls each one of the units which configure the administration PC 20 by performing various arithmetic processing. The input device 22 is for input direction by the user's outside operation. As an input device 22, a key board and a pointing device (mouse, etc.) are used in the example.

The input device control unit 23 output signals representing various commands input through the device 22 by the user to the CPU 21. The display device 24 displays various information to the user as visually recognizable images. In the example, as a display device 24, a liquid crystal display is used.

The display device control unit 25 displays images represented by the data output form the CPU 21 on the display device 24. The network interface 26 transmits and receives data through a communication cable (LAN cable) which is connected to the interface.

The data transmission/receiving unit 27 transmits data output from the CPU 21 via the network interface 26, and outputs data received via the network interface 26 to the CPU 21.

The storage unit 28 is to store various information, and is configured with a ROM, a RAM, hard disk drive (HDD), etc.

The storage unit 28 stores an electronic certificate to verify the identity of the CA 40 (hereinafter referred to the "CA certificate 40$c$") securely beforehand. The CA certificate 40$c$ is a public key certificate which verifies that the public key of the CA 40 corresponds to the CA 40.

Figure 19:
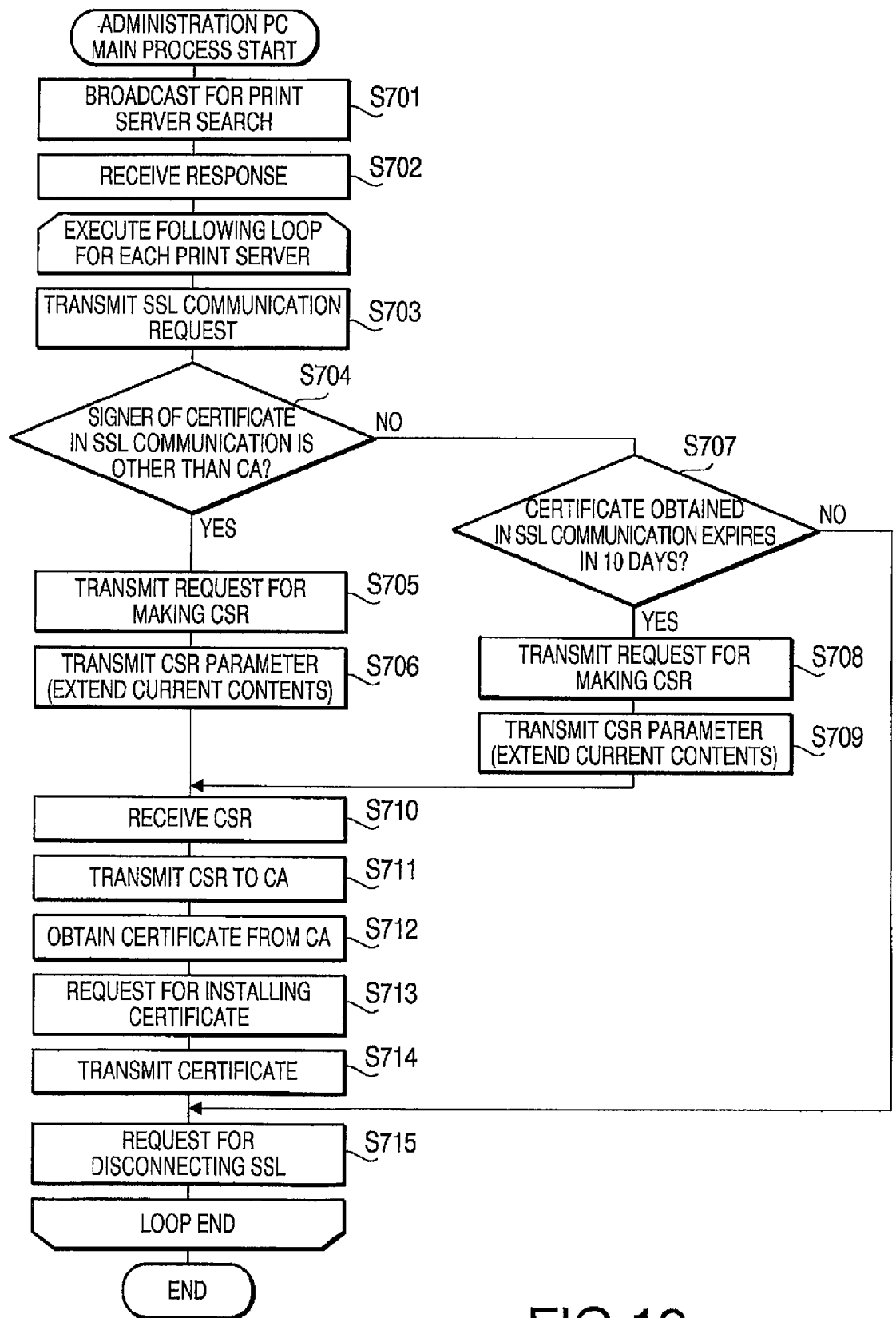
FIG. 19 is a flow diagram which shows the administration PC main process that the CPU of the administration PC.
Figure 20:
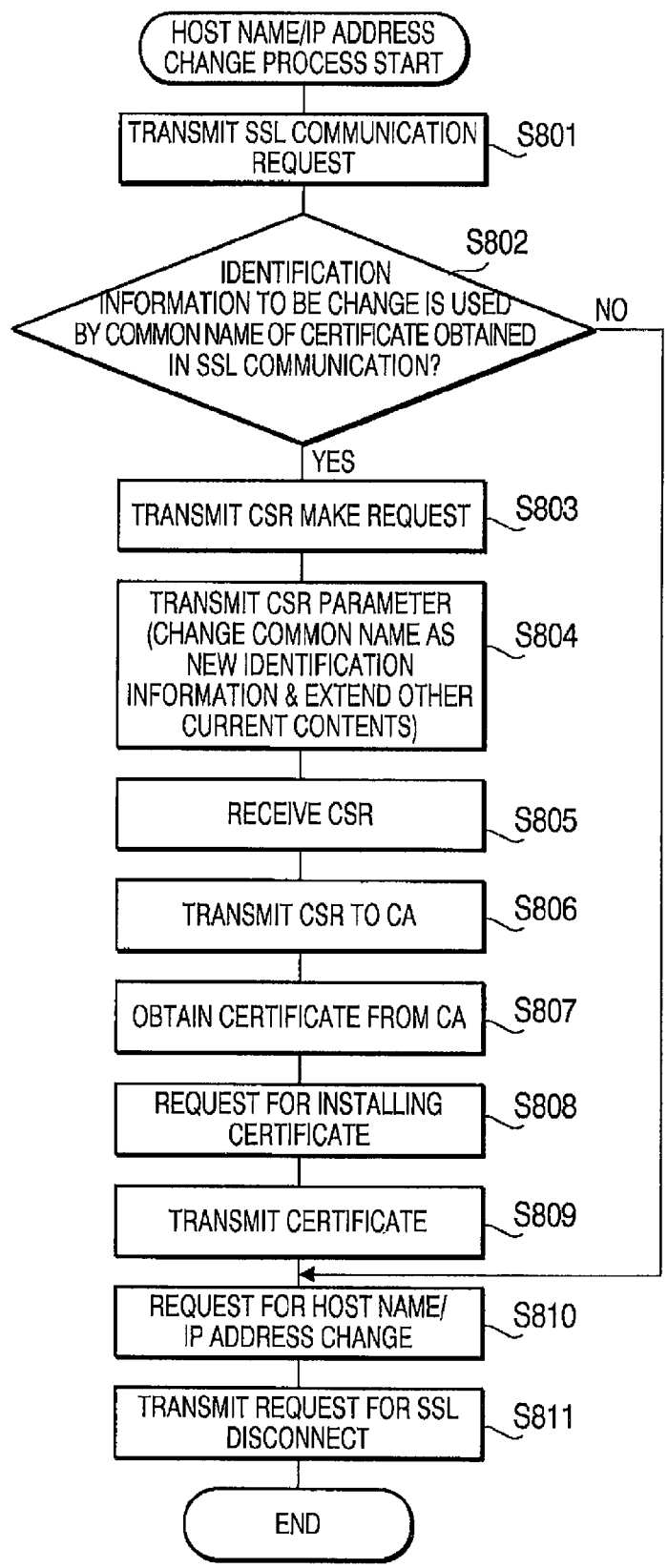
FIG. 20 is a flow diagram which shows the host name/IP address change process that the CPU of the administration PC.

The storage unit 28 stores a programs to make the CPU 11 execute various processes shown in FIG. 19 and FIG. 20.

2.3 Configuration of a Client PC

Figure 5:
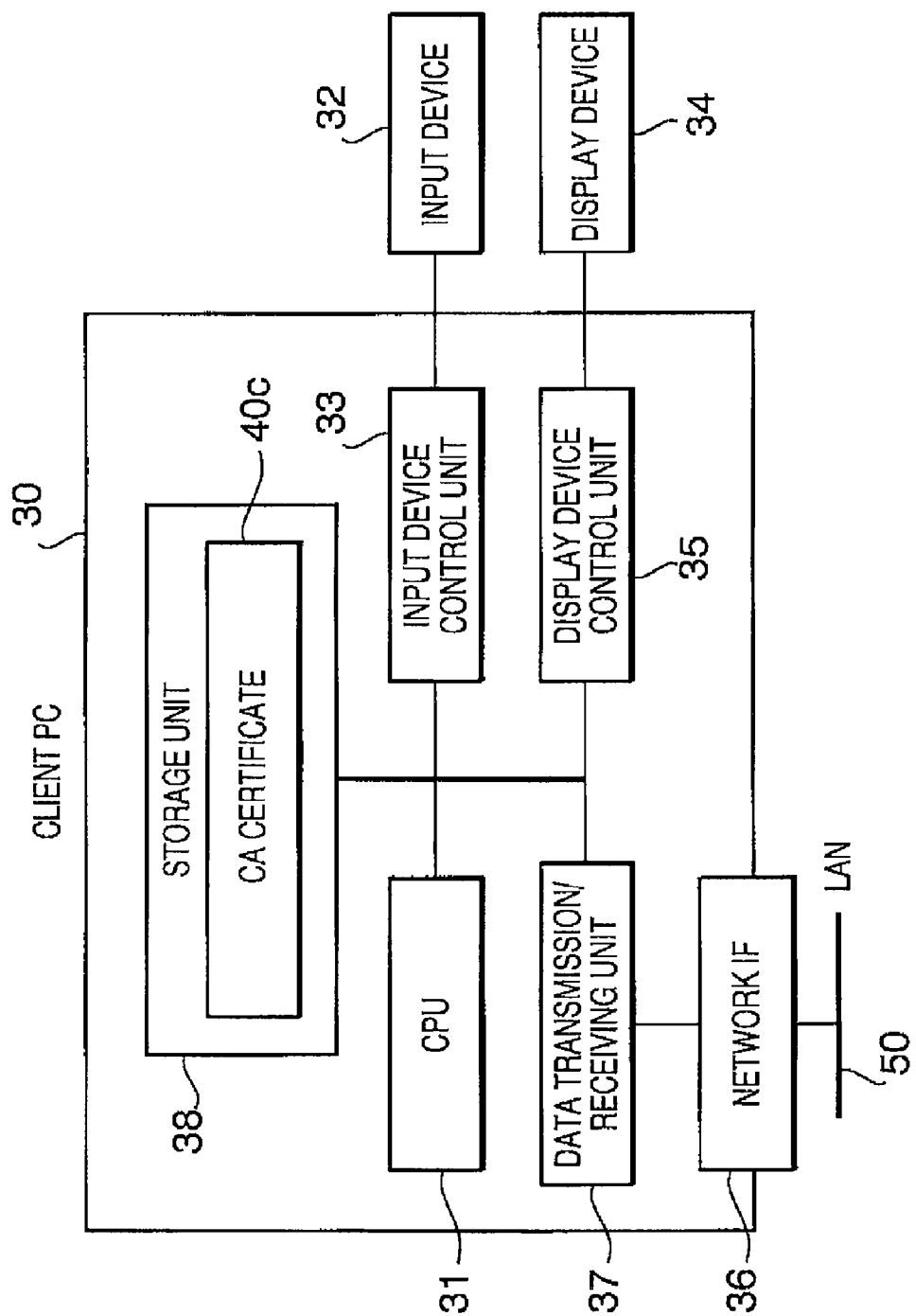
FIG. 5 is a block diagram which shows configuration of the client PC.

FIG. 5 is a block diagram which shows configuration of the client PC 30.

The client PC 30 is a computer which is used by the user of the network print system (multipurpose personal computer in the example). As can be seen in FIG. 5, the client PC 30 comprises a CPU 31, an input device 32, an input device control unit 33, a display device 34, a display device control unit 35, a network interface (network IF) 36, a data transmission/receiving unit 37 and a storage unit 38. In addition, the hardware configuration of the client PC 30 and the CA certificate 40$c$ are also stored securely beforehand in the same way of the case of the administration PC 20.

2.4 Configuration of the CA

Figure 6:
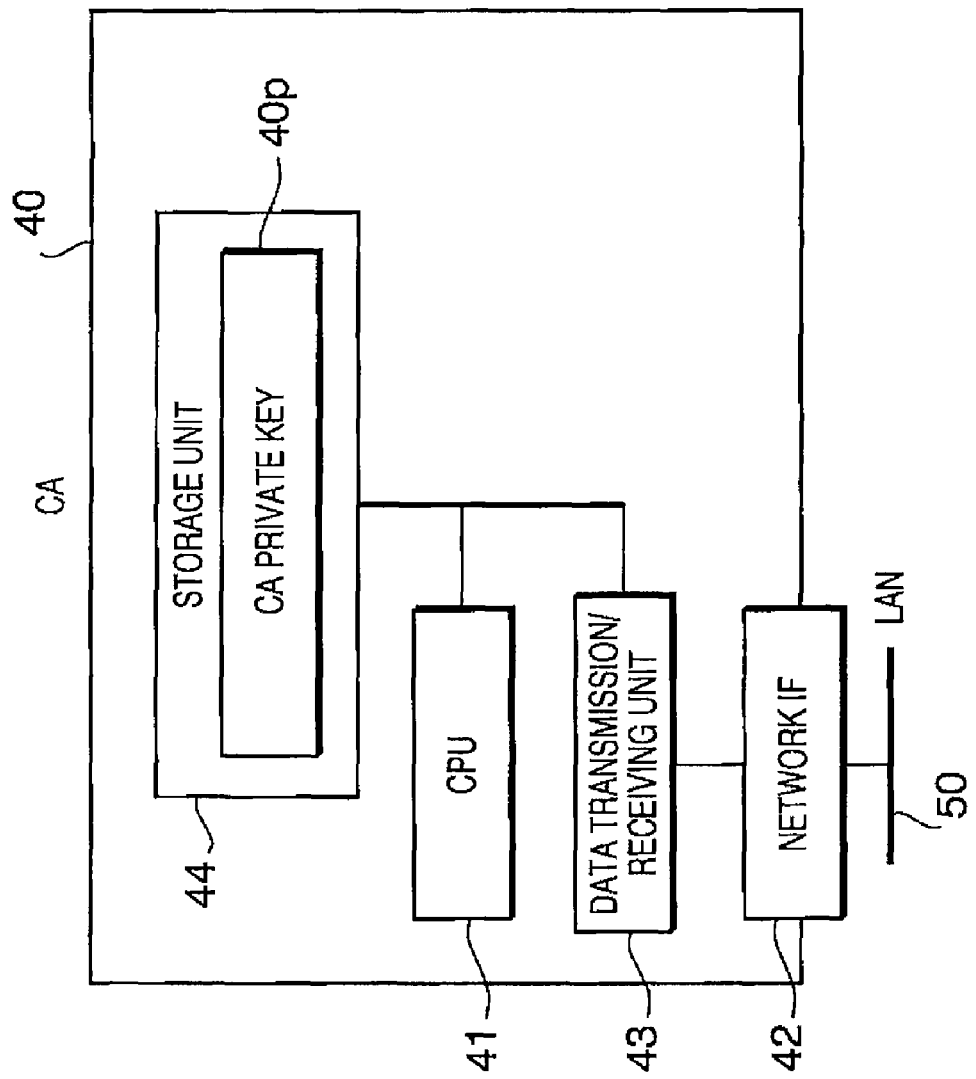
FIG. 6 is a block diagram which shows configuration of the CA.

FIG. 6 is a block diagram which shows configuration of the CA 40. The CA 40 is a device which functions as a certificate authority that issues an electronic certificate in the network print system. As can be seen, the CA 40 comprises a CPU 41, a network interface (network IF) 42, a data transmission/receiving unit 43 and a storage unit 44.

The CPU 41 controls each one of the units which configure the print server 10 by performing various arithmetic processing. The network interface 42 transmits and receives data through a communication cable (LAN cable) which is connected to the interface.

The data transmission/receiving unit 43 transmits data output from the CPU 41 via the network interface 42, and outputs data received via the network interface 42 to the CPU 41.

The storage unit 44 is to store various information, and is configured with a ROM, a RAM, hard disk drive (HDD), etc. The storage unit 44 stores a private key of the CA 40 (hereinafter referred to the "CA private key 40$p$").

3. Outline of the Communication

Next, outline of the communication in the network print system is described.

3.1 Communication for Printing

Figure 7:
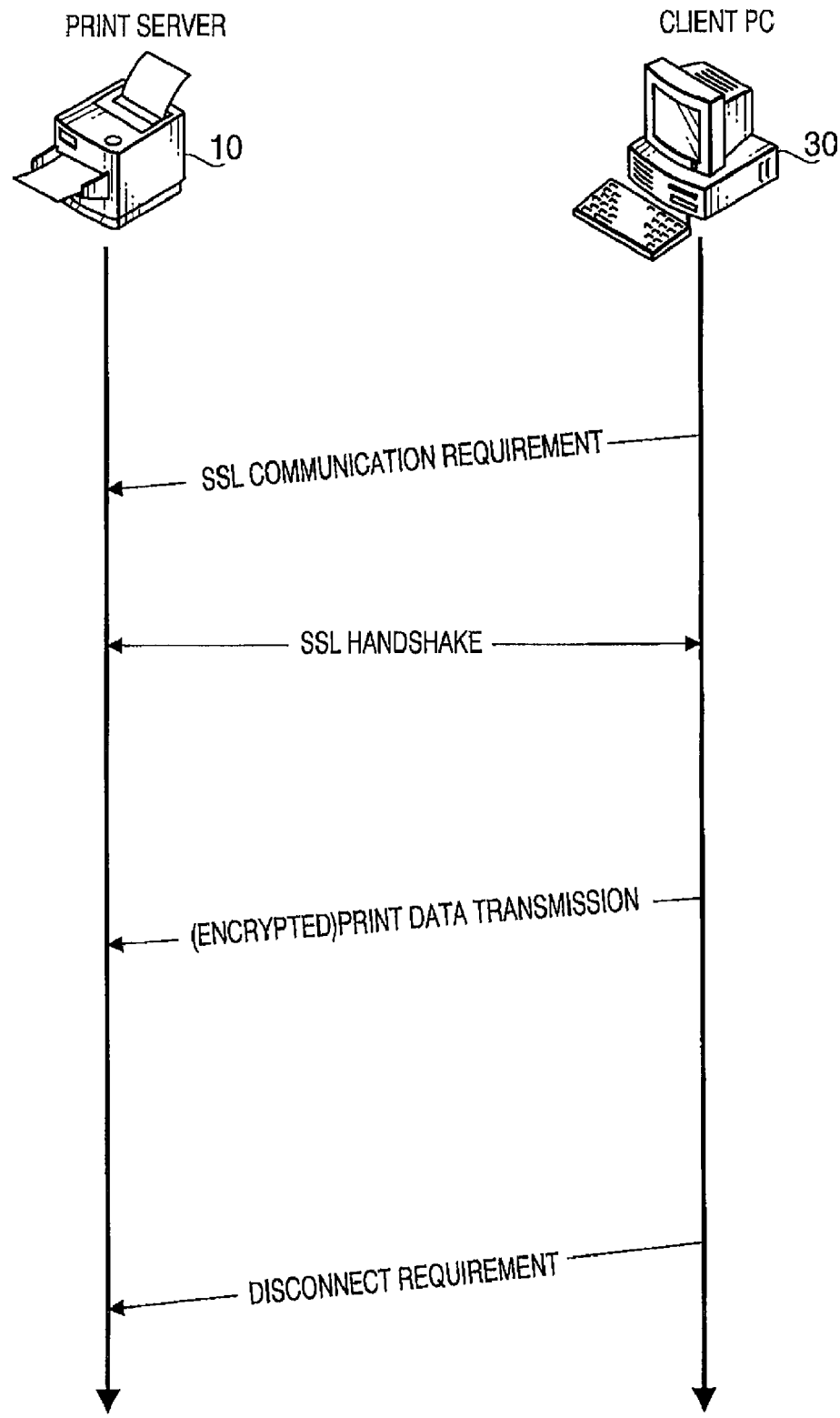
FIG. 7 is a ladder chart which shows an outline of communication between the print server and the client PC when the client PC transmits print data to the print server to print the data.

FIG. 7 is a ladder chart which shows an outline of communication between the print server 10 and the client PC 30 when the client PC 30 transmits print data to the print server to print the data. As shown in the FIG. 7, firstly, the client PC 30 transmits a request for SSL (Secure Sockets Layer) communication to start communication using SSL. Thus, SSL handshake is executed between the client PC 30 and the print server 10. In the SSL handshake, the client PC 30 receives a server certificate 10$c$ from the print server 10, a confirm process of the identity of the print server 10 by verifying an electronic signature of the server certificate 10$c$ using the CA certificate 40$c$ stored in the storage unit 38 (in particular, a public key of CA 40) is executed. A process of establishing the SSL connection is executed sharing a common key by an encryption communication using the server certificate 10$c$ (in particular, the server public key).

Thus, while the SSL connection is established, the client PC 30 transmits encrypted print data to the print server 10 using the common key. On the other hand, the print server 10 decrypts the received print data using the common key, and printout images represented by the print data with the print unit 12.

Then, after transmitting all of print data, the client PC 30 transmits the print server 10*a* SSL disconnect request which is requesting for terminating communication using SSL. Herewith, the SSL connection between the client PC 30 and the print server 10 is disconnected.

3.2 Communication for Server Certificate Administration

Figure 8:
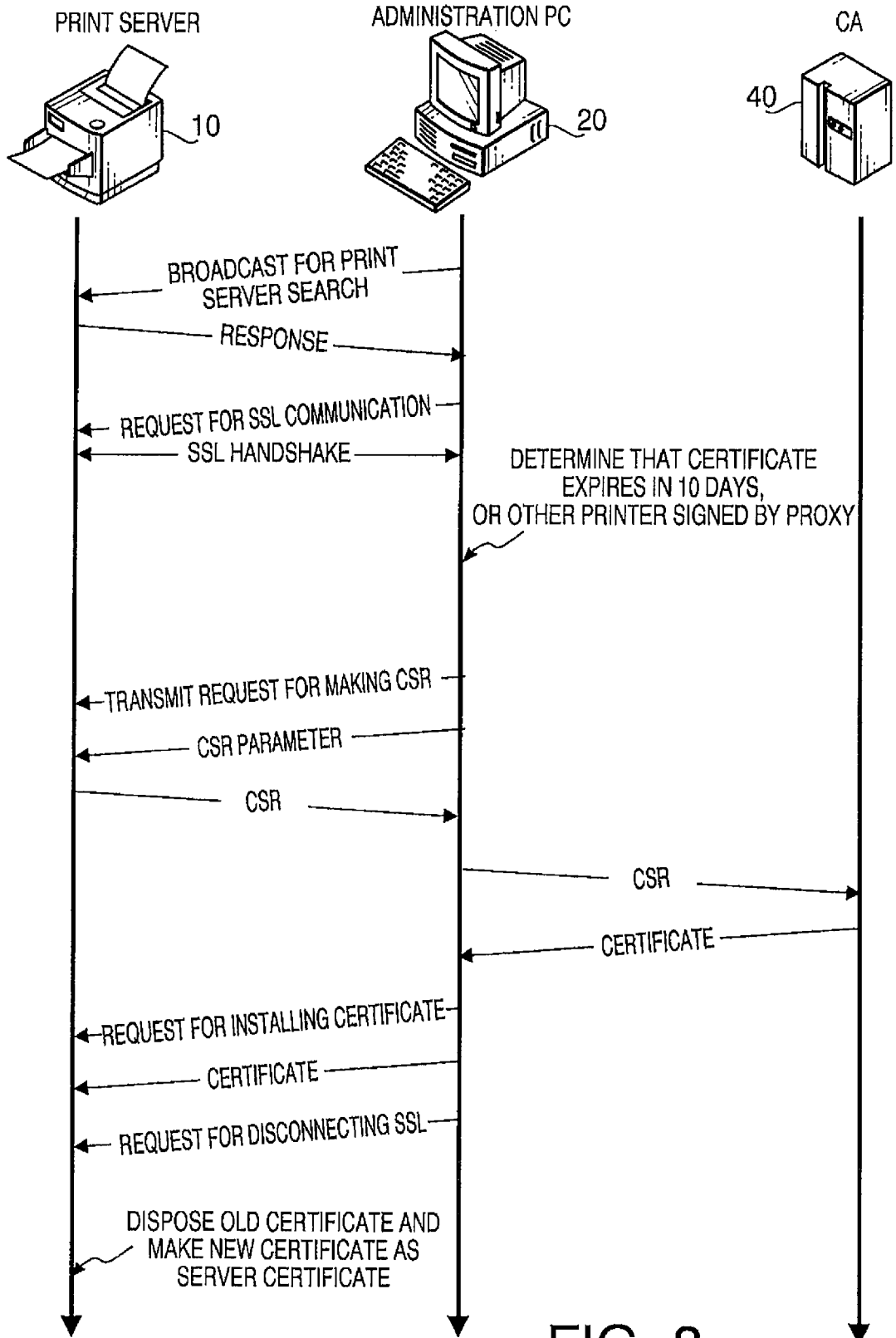
FIG. 8 is a ladder chart which shows an outline of communications between the print server 10 and the administration PC 20, and between the administration PC 20 and the CA 40.

FIG. 8 is a ladder chart which shows an outline of communications between the print server 10 and the administration PC 20, and between the administration PC 20 and the CA 40 in order that the administration PC 20 totally manages server certificates 10*c* which each print server 10 in the LAN 50 has.

As shown in the FIG. 8, firstly, the administration PC 20 broadcasts to search for a print server 10 in the LAN 50. The print server 10 in the LAN 50 makes a response to the broadcast.

The administration PC 20 transmits a SSL communication request to the responded print server 10 (if a plurality of print servers exist, to each print server 10). Thus, SSL handshake is executed between the administration PC 20 and the print server 10. Then, the administration PC 20 confirms the validity period and signer information (issuer information) contained in the server certificate 10*c* by referring to the server certificate 10*c* received from the print server 10 at the time of SSL handshake. Then, if the server certificate 10*c* is likely to expire soon (in the example, in the case that the validity period expires in 10 days) or the issuer is other than the CA 40, the administration PC 20 transmits a CSR (Certificate Signing Request) create request to request for creating CSR to the holder that is the print server 10 in order to update the server certificate 10*c*. Here, a CSR is a request message in order to issue a public key certificate (certificate signing request). In the network print system of the example, as can be seen in format example shown in FIG. 9, a CSR contains holder information, a public key, an expansion region and an electronic signature (digital signature). An actual CSR is not text data, in FIG. 9, it is sown in text for convenience of explanation.

Then, the administration PC 20 transmits CSR parameters which are items to be set in CSR. Here, the CSR parameters to be transmitted are carried on from the contents of the server certificate 10*c* that is received from the print server 10.

When the print server 10 receives a CSR create request and CSR parameters from the administration PC 20, the print server 10 creates a CSR based on the received CSR parameters and transmits the CSR to the administration PC 20.

When the administration PC 20 receives the CSR from the print server 10, the administration PC 20 transmits the received CSR to the CA 40. When the CA 40 receives the CSR from the administration PC 20, the CA 40 generates a server certificate 10*c* of the print server 10 electronically signed with the CA private key 40*p* based on the received CSR, and transmits the server certificate to the administration PC 20. The CA 40 of the example sets a validity period of the server certificate 10*c* to a predetermined period of time (for example, 1 year) after the issuance of the certificate. As a result, the validity period of the server certificate 10*c* is extended.

When the administration PC 20 receives the server certificate 10*c* from the CA 40, the administration PC 20 transmits a request for installing the server certificate 10*c* to the print server 10 that transmits the CSR, and further transmits the received server certificate 10*c*.

When the print server 10 receives a request for installing the certificate and the server certificate 10*c* from administration PC 20, by installing the received server certificate 10*c*, the received new server certificate 10*c* is set as the server certificate 10 of the print server instead of a old server certificate 10*c* (update a server certificate. 10*c*).

Thereafter, the administration PC 20 transmits a SSL disconnect request to the print server 10. Thus, the SSL connection between the print server 10 and administration PC 20 is disconnected.

3.3 Communication Identification Information Change of the Print Server

Figure 10:
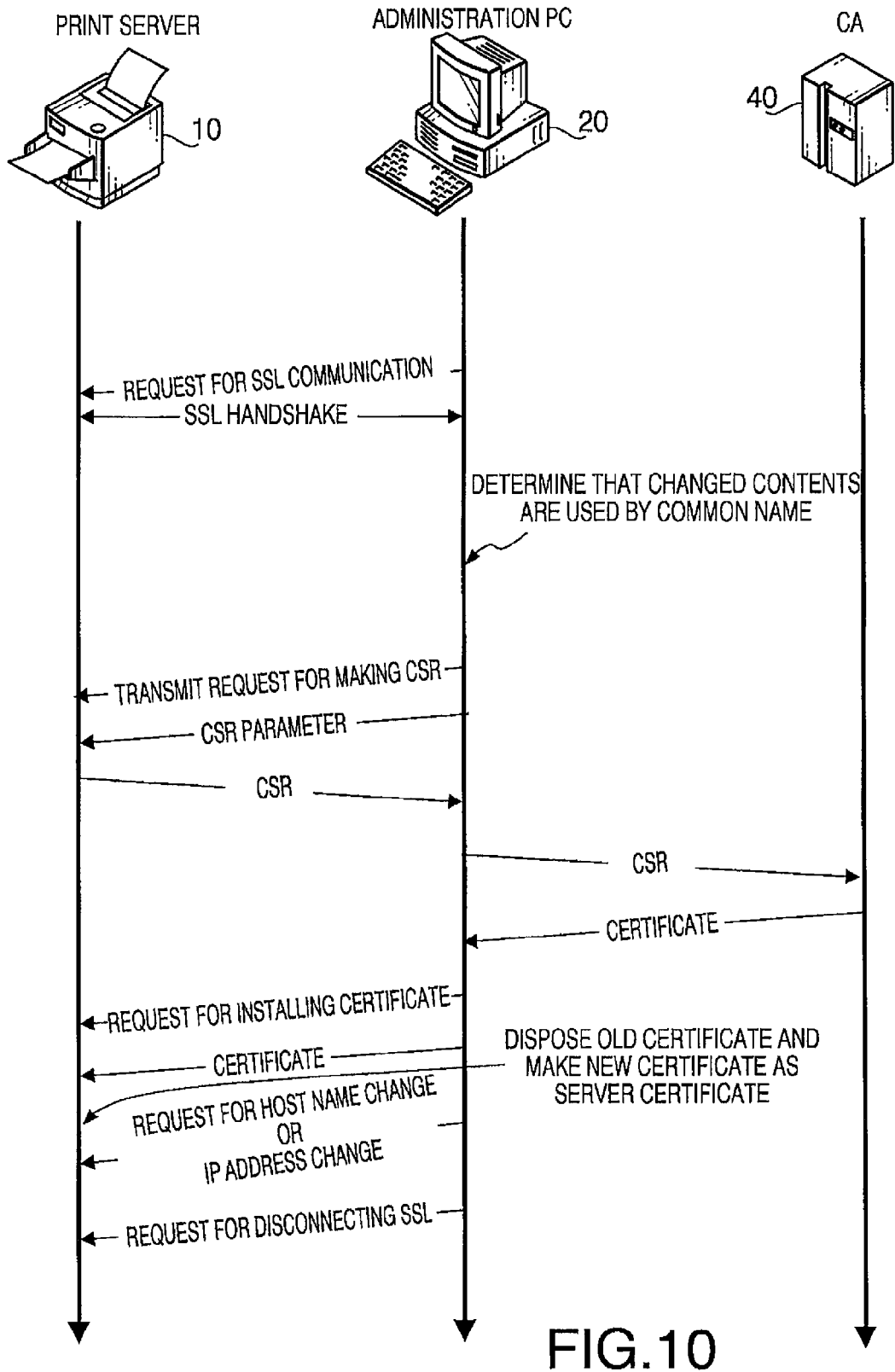
FIG. 10 is a ladder chart which shows an outline of communication between the print server and the administration PC, when identification information (IP address, host name) of the print server in the LAN is changed.

FIG. 10 is a ladder chart which shows an outline of communication between the print server 10 and the administration PC 20 and between the administration PC 20 and the CA 40, when identification information (IP address, host name) of the print server 10 in the LAN 50 is changed.

Figure 11:
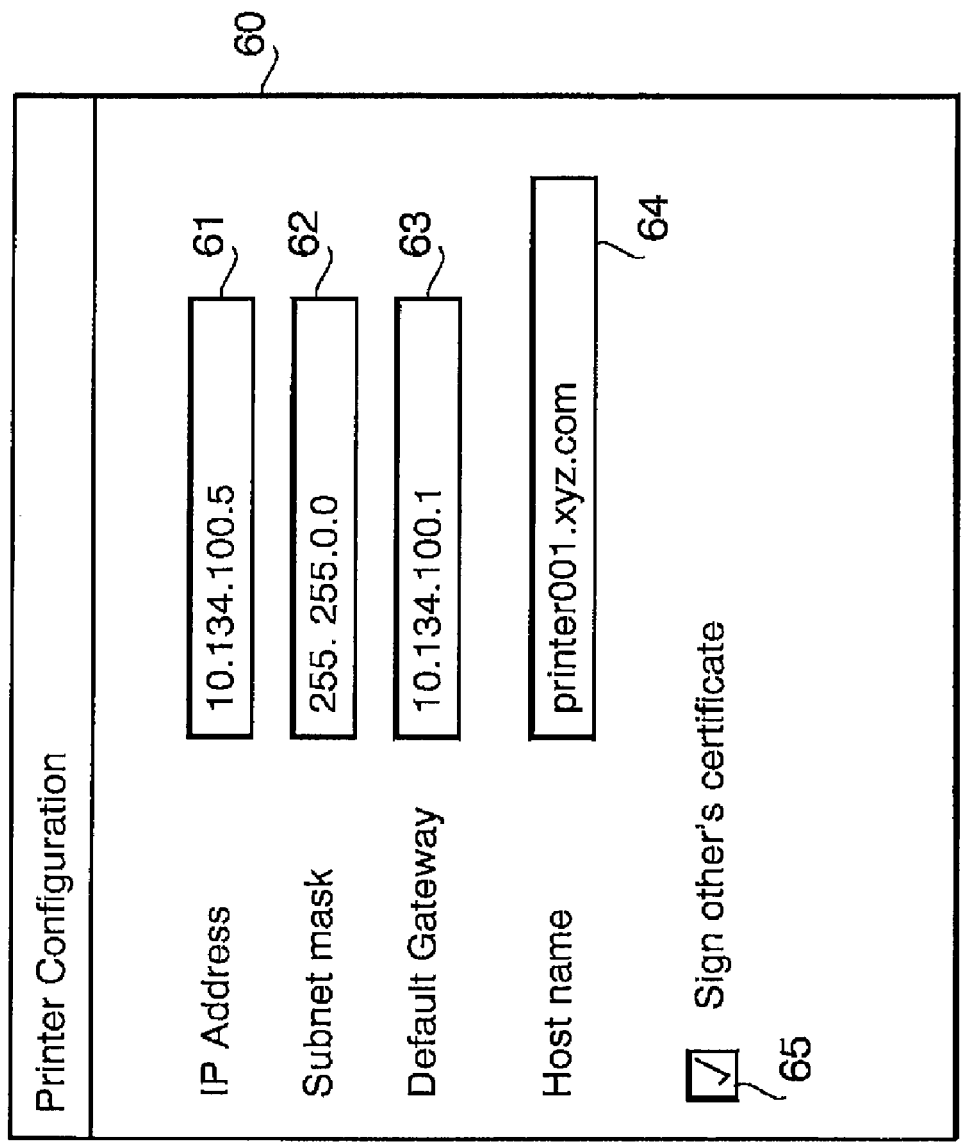
FIG. 11 is an illustration which shows the setup screen displayed on the display device of the administration PC.

The network print system is configured so that the one administration PC 20 totally manages a plurality of print servers 10 in the LAN 50. As shown in FIG. 11, each print server 10 is set up on the setup screen 60 displayed on the display device 24. In particular, the setup screen 60 contains a text box 61 that is for IP address input, a text box 62 that is for subnet mask input, a text box 63 that is for default gateway input, a text box 64 that is for host name input, and a checkbox 65 that is for on/off control of a certificate issuance function. Here, a checkbox 65 that is for on/off control of a certificate issuance function is a check box to activate a function to generate a server certificate 10*c* (electronically sign with the server's own server private key 10*p*) of another print server 10. Then, in the network print system, the administration PC 20 set up the print server 10 based on information input by the user with the setup screen 60. That is, the administration PC 20 transmits the information with the setup screen 60 to the print server 10, and the print server 10 sets up itself based on the information received from the administration PC 20. Thus, it is possible that the administration PC 20 manages a plurality of the print servers 10.

If IP address or host name that is identification information of a print server 10 is changed with the setup screen 60, the administration PC 20 transmits a request for SSL communication to the print server 10 of which identification information to be changed as shown in FIG. 10. Thus, SSL handshake is executed between the administration PC 20 and the print server 10. Then, the administration PC 20 confirms common name (holder information) contained in the server certificate 10*c* by referring to the server certificate 10*c* received from the print server 10 at the time of SSL handshake. Then, if identification information to be changed is used as a common name in the server certificate 10*c* (in the case of IP address change, if IP address is used as a common name or in the case of host name change, if the host name is used as a common name), the administration PC 20 transmits a CSR create request to the print server 10 in order to update the server certificate 10*c*, and further transmits CSR parameters. Here, the transmitted CSR parameters are carried on from contents of the server certificate 10*c* received from print server 10. The common name is identification information of the updated certificate.

If the print server 10 receives the CSR create request and the CSR parameters from the administration PC 20, the print server 10 creates CSR based on the received CSR parameters, and transmits the CSR to the administration PC 20.

If the administration PC 20 receives the CSR from the print server 10, the administration PC 20 transmits the received CSR to the CA 40. If the CA 40 receives the CSR from the administration PC 20, the CA 40 generates a server certificate 10*c* of the print server 10 electronically signed with CA private key 40*p* based on the received CSR, and transmits the server certificate 10*c* to the administration PC 20.

If the administration PC 20 receives the server certificate 10*c* from the CA 40, print server 10, the administration PC 20 transmits a request for installing the server certificate 10*c*, and transmits the server certificate 10*c* received from the CA 40. When the print server 10 receives a request for installing the certificate and the server certificate 10*c* from administration PC 20, by installing the received server certificate 10*c*, the received new server certificate 10*c* is set a the server certificate 10 of the print server instead of a old server certificate 10*c* (update a server certificate 10*c*).

Thereafter, the administration PC 20 transmits an identification information change request to request for changing identification information (in particular, host name change request or IP address change request) to the print server 10, and further transmits a SSL disconnect request. Thus, the SSL connection between the print server 10 and administration PC 20 is disconnected.

3.4 Communication for Alternative Signing

Figure 12:
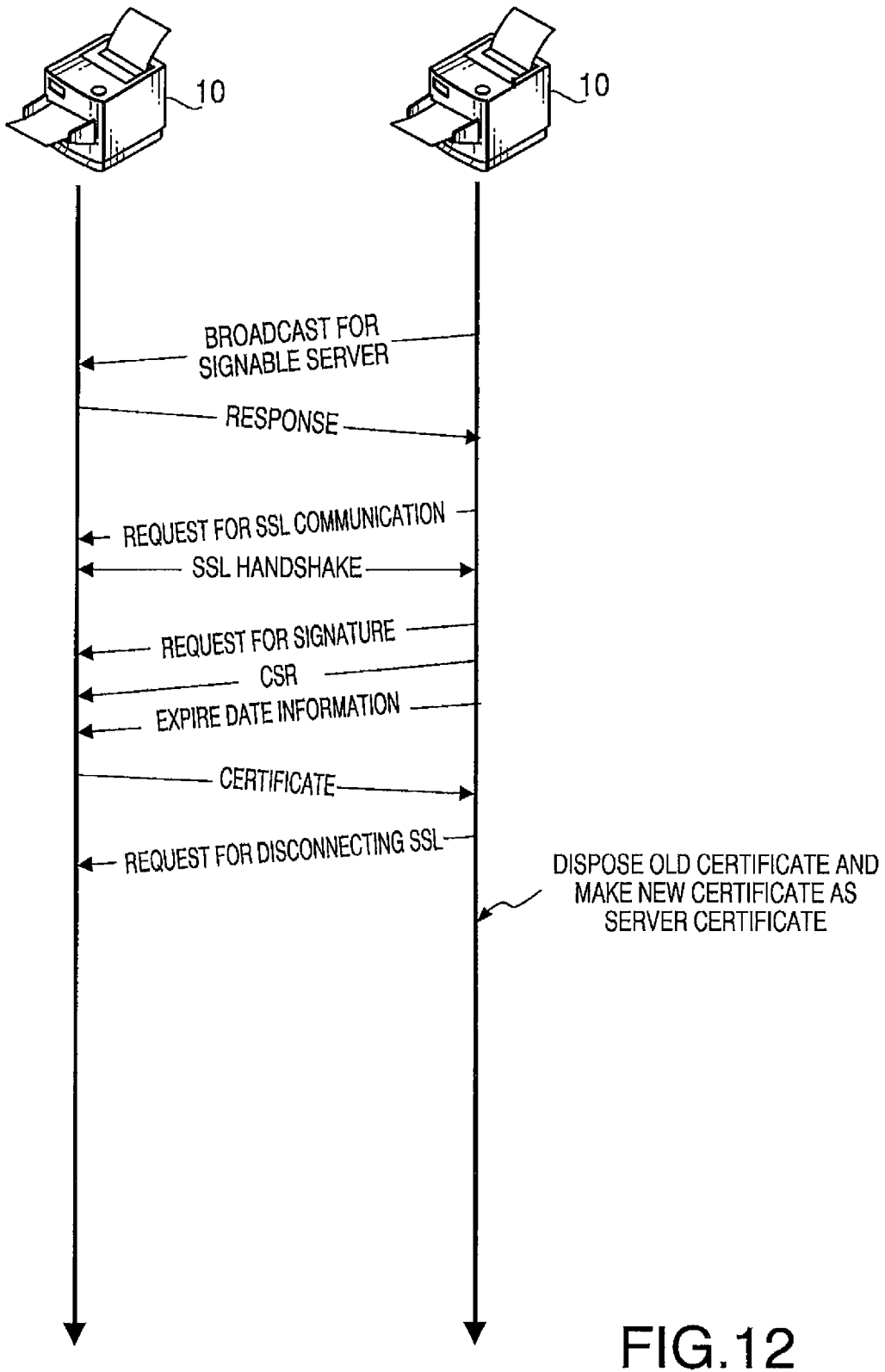
FIG. 12 is a ladder chart which shows an outline of communication between two print servers, when one of the print server requests the other print server to generate a server certificate.

FIG. 12 is a ladder chart which shows an outline of communication between two print servers 10, when one of the print server 10 requests the other print server 10 to generate a server certificate 10*c*.

As shown in FIG. 12, firstly, broadcast for signable server search is executed to search for a print server 10 which determines that the own server certificate 10*c* is not updated by the administration PC 20, although the server certificate 10*c* is likely to expire and should be updated by the administration PC 20, exists in the LAN 50, and can generate a server certificate 10*c* of other print server 10, that is, a function to generate a server certificate 10*c* of other print server 10 is valid and the own server certificate 10*c* is valid and is not by alternate signing (the check box 65 of the setup screen 60 is already set "on") (referred to the "first print server" for convenience of explanation). Correspondingly, the print server 10 in the LAN 50 makes a response whether the print server 10 itself is possible to generate a server certificate 10*c* of other print server 10. The network print system of the example is configured so that one common CA 40 signs server certificates of all of the print servers 10 in the LAN 50. However, optionally, the network print system may be configured so as to comprise a plurality of CA in the LAN 50. If the network print system has a plurality of CA, there may exist in the LAN 50 a second print server 10 of which the server certificate 10*c* has been signed by a different CA other than the CA has signed the server certificate of the first print server 10. In such a system, the CA which has signed the certificate may be comprised in a response to an inquiry whether alternative signing is possible. In this way, when the first print server 10 receives a response, the first print server 10 finds out a CA which signed the server certificate of the responded print server 10, and determines whether the CA is identical with a CA that singed a server certificate 10*c* of the first print server 10 itself. If the CA is not identical, it is possible that the first print server 10 does not request the second print server 10 for alternative signing. Thus, because the first print server request only the print server 10 of which the server certificate is singed by the same CA, the first print server can make a highly reliable print server 10 to issue a server certificate 10*c* even in the alternative signing.

The first print server 10 transmits a SSL communication request to one of the print servers 10 which responded as being capable of generating a server certificate 10*c* of other print server 10 (hereinafter referred to the "second print server for convenience of explanation). Thus, SSL handshake is executed between the first print server 10 and the second print server 10. Then, the first print server 10 creates a CSR, and transmits a signature request that requests for generating a server certificate 10*c* (electronic signature) to the second print server 10, and transmits further the generated CSR. Here, the CSR is carried on from the contents of the server certificate that the first print server hold at this time. A CSR used in the example (see FIG. 9) does not contain validity period related items of the server certificate 10*c*, the first print server 10 transmit validity period information indicating a validity period of the server certificate 10*c* to be requested for generation in addition to a CSR. In the example, the validity period is indicated to be 20 days after the issuance of the certificate.

If the second print server 10 receives the signature request, CSR and validity period information from the first print server 10, based on the received CSR and the received validity period information, the second print server 10 generates a server certificate 10*c* of the first print server 10 electronically signed with the own server private key 10*p*, and transmits the certificates to the first print server 10.

If the first print server 10 receives the server certificate 10*c* from the second print server 10, by installing the received server certificate 10*c*, the received new server certificate 10*c* is set as the server certificate 10 of the print server instead of a old server certificate 10*c* (update a server certificate 10*c*).

Thereafter, the first print server 10 transmits a SSL disconnect request to the second print server 10. Herewith, the SSL connection between the first print server 10 and the second print server 10 is disconnected.

4. Processes Executed by a Print Server and an Administration Device

Processes executed by a print server 10 and an administration PC 20 to realize the above described communication are explained.

4.1 Main Server Process

Figure 13:
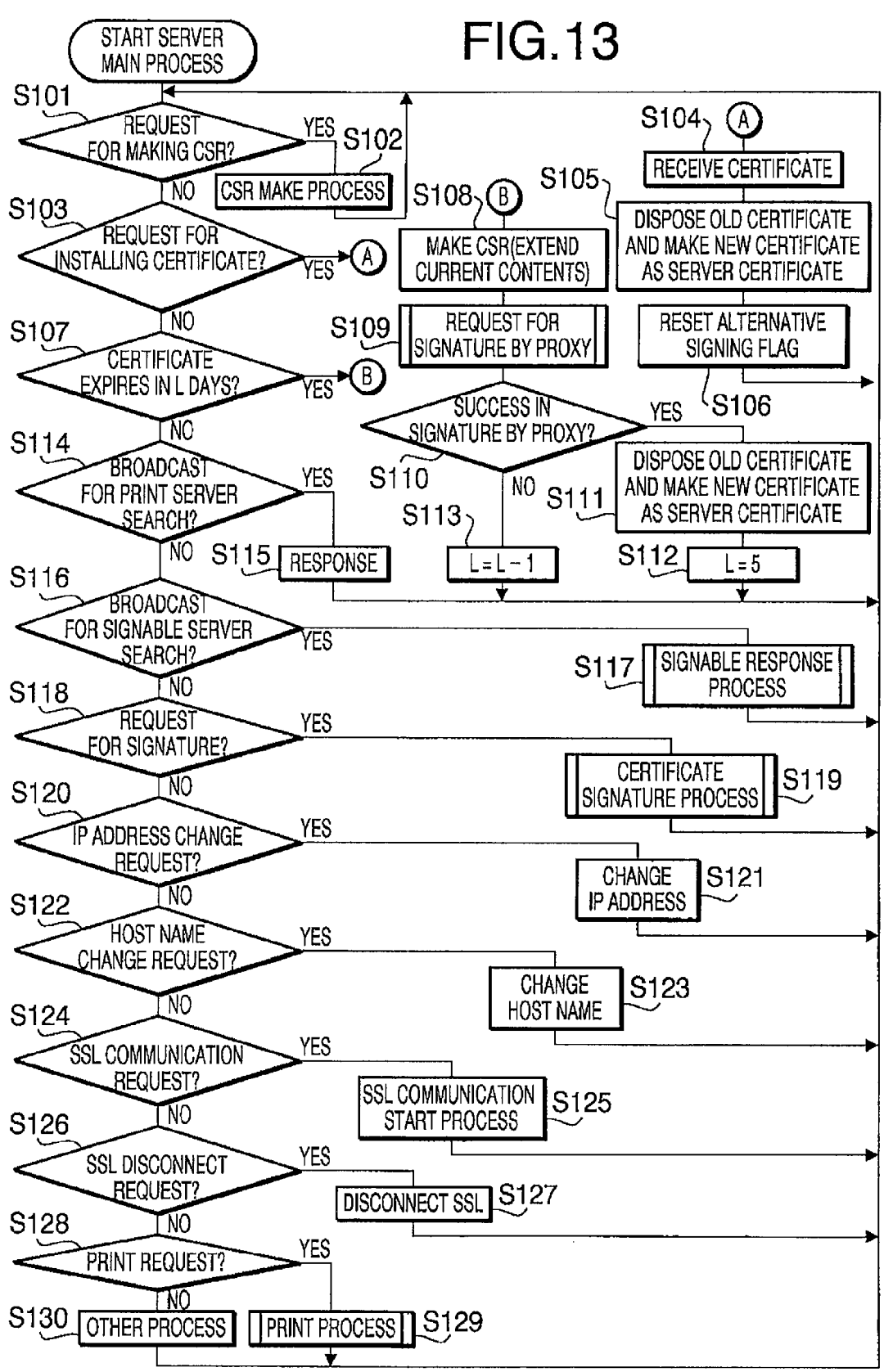
FIG. 13 is a flow diagram which shows the server main process that the CPU of the print server executes.

Firstly, referring to a flow chart shown in FIG. 13, a server main process executed by the CPU 11 of the print server 10 is described.

When the server main process starts, it is determined whether a CSR create request is received at S101. Here, the CSR create request is transmitted at S705, S708 in a administration PC main process executed by a CPU 21 of the administration PC 20 which is described later (see FIG. 19), and at S803 in a host name/IP address change process (see FIG. 20).

Then, if it is determined that the CSR create request is received at S101, the process goes to S102. After the CSR create process to create CSR necessary for generation of the own server certificate 10*c* of the server itself, the process goes back to S101. The details of the CSR create process are described later (see FIG. 14).

On the other hand, if it is determined that the CSR create request is not received at S101, the CPU 11 goes to S103, it is determined whether a certificate install request is received. Here, the certificate install request is transmitted at S713 in a administration PC main process executed by a CPU 21 of the administration PC 20 which is described later (see FIG. 19), and at S808 in a host name/IP address change process (see FIG. 20).

Then, if it is determined that the certificate install request is received at S103, the CPU 11 goes to S104, and a process to receive the server certificate 11*c* is executed. Here, the server certificate 10*c* is transmitted at S714 in a administration PC main process executed by a CPU 21 of the administration PC 20 which is described later (see FIG. 19), and at S809 in a host name/IP address change process (see FIG. 20).

Next, at S105, by installing the server certificate 10*c* received at S104, the received new server certificate 10 is set as the received server certificate 10c of the print server instead of a old server certificate 10c. That is, the server certificate 10c is updated.

Next, at S106, an alternative signing flag is reset. An alternative signing flag is a flag indicating that the server certificate 10c is by alternative signing. If the alternative signing flag is reset, the server certificate 10c is not due to alternative signing. Thereafter, the CPU 11 goes back to S101.

On the other hand, if at S103 it is determined that the certificate install request is not received, the CPU 11 goes to S107, and it is determined whether a validity period of the own server certificate 10c expires in the predetermined period of time. In the example, it is determined whether the current day and time is in L days before the expiration date. Here, the value of the variable L is set at later time than the time when the server certificate 10c is possible to be updated by the administration PC 20 (10 days before the expiration data). In the example, the variable L has 5 as an initial value. Therefore, determination whether the current day and time is in L days before the expiration date is, in another respect, determination whether the server certificate 10c is not updated by the administration PC 20, although the server certificate 10c should be updated by the administration PC 20 (for example in the case that the administration PC 20 malfunctions).

Then, if it is determined whether the current day and time is in L days before the expiration date at S107, the CPU 11 goes to S108, and a CSR is created. Here, the created CSR is carried on from the contents of the server certificate that the first print server hold at this time.

Next, an alternative signing request process to request other print server 10 in the LAN 50 for generation of a server certificate 10c (electronic signature) is executed at S109. Details of the alternative signing request process are described later (see FIG. 15).

Next, it is determined whether at S110 by the alternative signing request process at S109, the alternative signing is successfully executed (whether other print server 10 generates the server certificate 10c). Then, if it is determined that the alternative signing successfully done at S110, the CPU 11 goes to S111, by installing the received server certificate 10c at the alternative signing request process, the received new server certificate 10c is set as the server certificate 10 of the print server instead of an old server certificate 10c. That is, the server certificate 10c is updated Next, the value of the variable L is reset to be 5 at S112. Thereafter, the CPU 11 goes back to S101. On the other hand, if it is determined that the alternative signing is not successfully done at S110 (failed), the CPU 11 goes to S113, the value of the variable L is subtracted by 1. Thus, the alternative signing request process is executed again (re-tried) on the following day (S107: YES, S108, S109). Thereafter, the CPU 11 goes back to S101.

On the other hand, if it is determined whether the current day and time is not in L days before the expiration date at S107, the CPU 11 goes too S114, and it is determined whether transmitted data of broadcast for print server search is received. Here, broadcast for print server search is transmitted at S701 in a administration PC main process executed by a CPU 21 of the administration PC 20 which is described later (see FIG. 19).

Then, it is determined that the transmitted data of broadcast for print server search is received at S114, the CPU 11 goes to S115, and return response data corresponding to the broadcast for print server search. Thereafter, the CPU 11 goes back to S101. On the other hand, it is determined that the transmitted data of broadcast for print server search is not received at S114, the CPU 11 goes to S116, and it is determined whether transmitted data of broadcast for signable server search is received. Here, broadcast for signable server search is transmitted at S301 in an alternative signing request process executed by the CPU 11 of the other print server 10 which is described later (see FIG. 15).

Then, it is determined that the transmitted data of broadcast for signable server search at S116, the CPU 11 goes to S117, and after the signable response process is executed, the CPU 11 goes back to S101. The details of the signable response process are described later (see FIG. 16).

On the other hand, it is determined that the transmitted data of broadcast for signable server search at S116, the CPU 11 goes to S118, and it is determined whether the signature request is received. Here, the signature request is transmitted at S305 in an alternative signing request process executed by the CPU 11 of the other print server 10 which is described later (see FIG. 15).

Then, if it is determined that the signature request is received at S118, the CPU 11 goes to S119, after a certificate signature process which generates server certificate 10c of the print server 10 from which the signature request is transmitted is executed, the CPU 11 goes back to S101. Details of the certificate signature process are described later (see FIG. 17).

On the other hand, if it is determined that the signature request is received at S118, the CPU 11 goes to S120, and it is determined whether an IP address change request is received. Here, the IP address change request is transmitted at S810 in a host name/IP address change process executed by a CPU 21 of the administration PC 20 (see FIG. 20).

Then, if it is determined that an IP address change request is received at S120, the CPU 11 goes to S121, the own IP address of the server is changed to the one which is designated by the IP address change request. Thereafter, the CPU 11 goes back to S101. On the other hand, if it is determined that an IP address change request is received at S120, the CPU 11 goes to S122, it is determined whether a host name change request is received. Here, the host name change request is transmitted at S810 in a host name/IP address change process executed by a CPU 21 of the administration PC 20 (see FIG. 20).

Then, if it is determined that a host name change request is received at S122, the CPU goes to S123, and the own host name of the server is changed to the one which is designated by the host name change request. Thereafter, the CPU 11 goes back to S101

On the other hand, if it is determined that a host name change request is not received at S122, the CPU 11 goes to S124, and it is determined whether a SSL communication request is received. Here, the SSL communication request is transmitted at S304 in the alternative signing request process executed by a CPU 11 of the other print server which is described later (see FIG. 15), at 703 in a administration PC main process executed by a CPU 21 of the administration PC 20 which is described later (see FIG. 19), and at S801 in a host name/IP address change process (see FIG. 20), etc.

Then, if it is determined that a SSL communication request is received at S124, the CPU 11 goes to S125, a process to start SSL communication is executed. Thereafter, the CPU 11 goes back to S101.

On the other hand, if it is determined that a SSL communication request is not received at S124, the CPU 11 goes to S126, and it is determined whether a SSL disconnect request is received. Here, the SSL disconnect request is transmitted at S309 in the alternative signing request process executed by a CPU 11 of the other print server which is described later (see FIG. 15), at S715 in a administration PC main process executed by a CPU 21 of the administration PC 20 which is described later (see FIG. 19), and at S811 in a host name/IP address change process (see FIG. 20), etc.

Then, if it is determined that a SSL disconnect request is received at S126, the CPU 11 goes to S127, a process to disconnect a SSL connection is executed. Thus, the SSL connection is disconnected. Thereafter, the CPU 11 goes back to S101.

On the other hand, if it is determined that a SSL disconnect request is not received at S126, the CPU 11 goes to S128, and it is determined whether a print request is received from the client PC 30. Then, if it is determined that the print request is received at S128, the CPU 11 goes to S129, and after the print process which prints images represented by print data image is executed, the CPU goes back to S101. The details of the print process are described later (see FIG. 18).

On the other hand, if it is determined that the print request is not received at S128, the CPU 11 goes to S130, the other processes (SSL handshake process, etc.) are executed. Thereafter, the CPU 11 goes back to S101.

4.2 CSR Create Process

Figure 14:
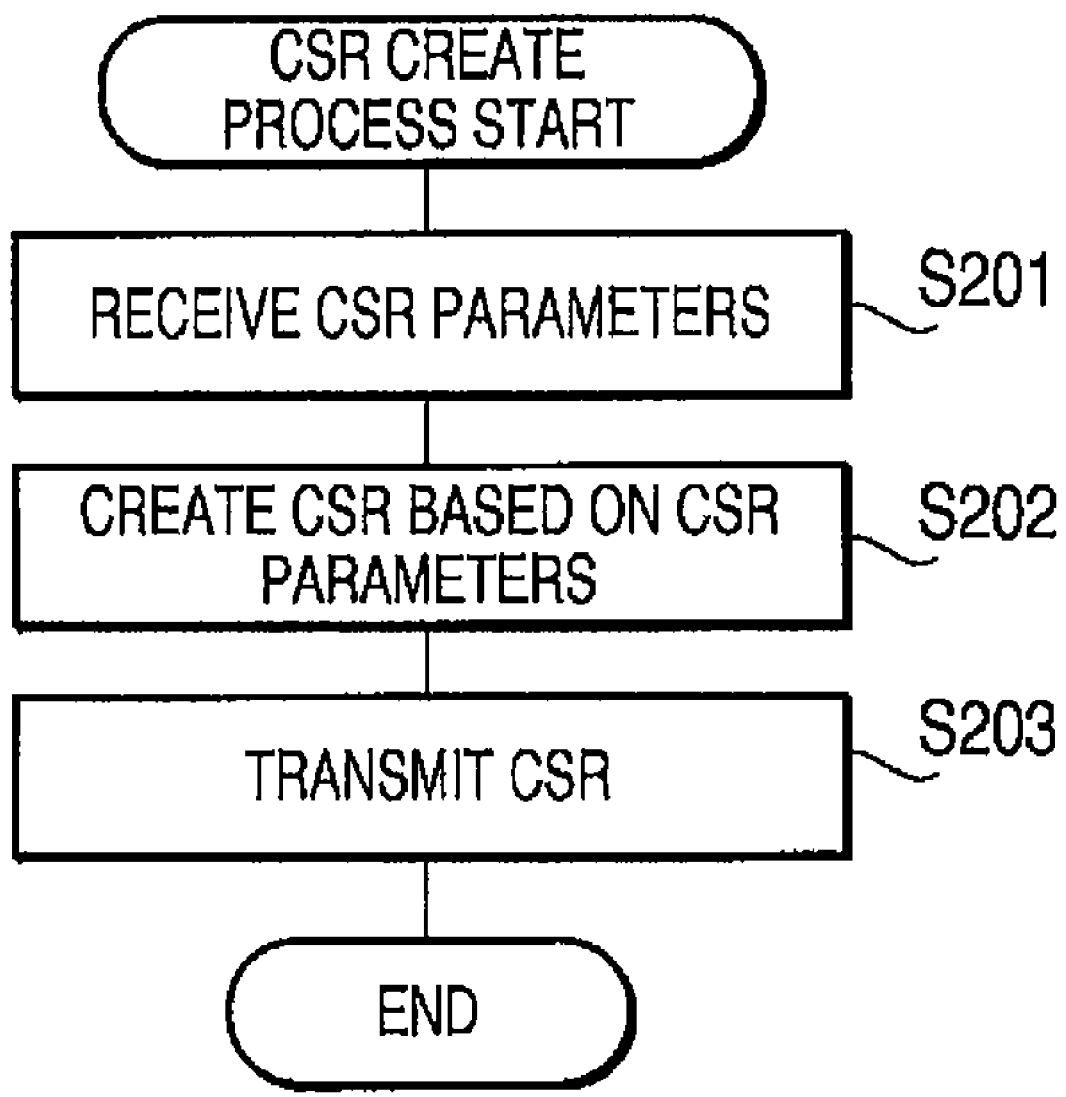
FIG. 14 is a flow diagram which shows the CSR create process that the CPU of the print server executes.

Next, referring to a flow chart shown in FIG. 14, a CSR create process which is executed at S102 in the above described server main process (see FIG. 13) is described.

When the CSR create process starts, firstly, a process to receive CSR parameters at S201. Here, CSR parameters are transmitted at S706, S709 in a administration PC main process executed by a CPU 21 of the administration PC 20 which is described later (see FIG. 19), and at S804 in a host name/IP address change process (see FIG. 20), etc.

Next, a CSR is created at S202 based on the received CSR parameters at S201. Then, the created CSR is transmitted to the administration PC 20 at S203. Thereafter, the CSR create process is terminated.

4.3 Alternative Signing Request Process

Figure 15:
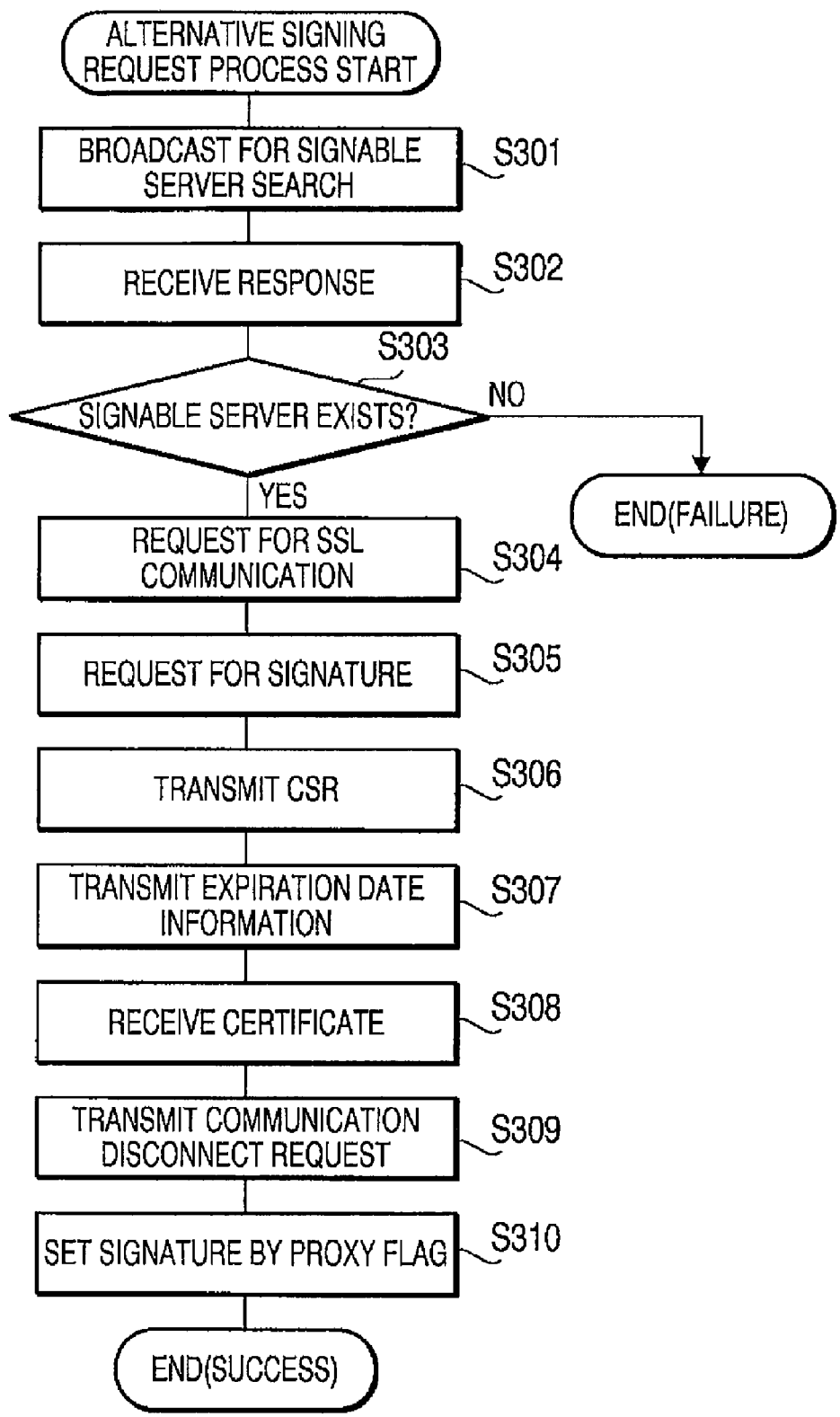
FIG. 15 is a flow diagram which shows the alternative signing request process that the CPU of the print server executes.

Next, referring to a flow chart shown in FIG. 15, an alternative signing request process which is executed at S109 in the above described server main process (see FIG. 13) is described.

When the alternative signing request process starts, firstly, broadcast for signable server search is executed to search for a print server 10 in the LAN 50 which can generate a server certificate 10c of other print server 10 (electronically signable).

Next, at S302, a process to receive data returned as a response of the broadcast for signable server search at S301. Here, the response data is transmitted at S117 in the above described server main process executed by a CPU of the other print server in the LAN 50 (particularly, at S402, S403 in FIG. 16 which are described later).

Next, at S303, it is determined whether there exists a print server in the LAN 50 which can generate a server certificate 10c of other print server 10 (electronically signable).

Then, if it is determined that there does not exist a print server in the LAN 50 which can generate a server certificate 10c of other print server 10 (electronically signable print server) at S303, the alternative signing request process is terminated as a failure of the alternative signing. As a result, it is determined that the alternative signing is failed (S110: NO) at S110 in the above described server main process.

On the other hand, it is determined that there exists a print server in the LAN 50 which can generate a server certificate 10c of other print server 10 (electronically signable print server) at S303, the CPU 11 goes to S304, and the SSL communication request is transmitted to one of such print servers 10. Thus, the SSL connection is established.

Next, a signature request is transmitted to the print server with which the SSL connection is established at S305. Next, the CSR created at S108 in the server main process (see FIG. 13) is transmitted to the print server 10.

Next, validity period information indicating a validity period of a server certificate 10c to be requested for generation (20 days after the issuance in the example) is transmitted to the print server 10 at S307.

Next, at S308, a process to receive a server certificate 10c transmitted from the print server 10 corresponding to the signature request, the CSR and the validity period information transmitted at S305-S307. Here, the server certificate 10c is transmitted at S119 in the server main process (see FIG. 13) executed by the CPU 11 of the print server 10 from which the signature request, etc. are transmitted (particularly, at S52, S403 in FIG. 16 which are described later).

Next, a SSL disconnect request is transmitted at S309. Thus, the SSL connection is disconnected. Next, at S310, an alternative signing flag is set. An alternative signing flag is a flag indicating that the server certificate 10c is by alternative signing. If the alternative signing flag is set, the server certificate 10c is due to alternative signing. Thereafter, the alternative signing request process is terminated as a success of the alternative signing. As a result, it is determined that the alternative signing is succeeded (S110: YES) at S110 in the above described server main process.

4.4 Signable Response Process

Next, referring to a flow chart shown in FIG. 16, a signable response process which is executed at S117 in the above described server main process (see FIG. 13) is described.

When the signable response process starts, firstly, it is determined whether a server certificate 10c of other print server 10 can be generated (electronically signable) at S401. Specifically, it is determined that a server certificate 10c of other print server 10 can be generated, if a function to generate a server certificate 10c of other print server 10 is set "on" on the setup screen 60 displayed on the display device 24 of the administration PC 20 (see FIG. 11), (in the case that a check box 65 that is for "on/off" control of a certificate issuance function is already set "on"), and the own server certificate 10c is valid and is not by alternative signing (that is, alternative signing flag is not set).

Then, if it is determined whether a server certificate 10c of other print server 10 can be generated at S401, the CPU 11 goes to S402, and return response data that a server certificate 10c of other print server 10 can be generated. Thereafter, the signable response process is terminated.

On the other hand, if it is determined whether a server certificate 10c of other print server 10 cannot be generated at S401, the CPU 11 goes to S403, and return response data that a server certificate 10c of other print server 10 cannot be generated. Thereafter, the signable response process is terminated.

4.5 Certificate Signature Process

Next, referring to a flow chart shown in FIG. 17, a certificate signature process which is executed at S119 in the above described server main process (see FIG. 13) is described When the certificate signature process starts, firstly, a process to receive CSR and validity period information is executed at S501. Here, the CSR and the validity period information are transmitted at S109 in the above described server main process executed by the CPU of the print server from which the signature request is transmitted (particularly, at S306, S307 in FIG. 15 which are described above).

Next, at S502, an electronically signed server certificate 10c is generated with the own server private key 10p based on the CSR and the validity period information received at S501.

Then, at S503, the server certificate 10c generated at S502 is transmitted to the print server 10 from which the signature request is transmitted. Thereafter, the certificate signature process is terminated.

4.6 Print Process

Next, referring to a flow chart shown in FIG. 18, a print process which is executed at S129 in the above described server main process (see FIG. 13) is described.

When the print process starts, firstly, a process to receive print data from the client PC 30 at S60. Next, at S602, images represented by the print data received at S601 are printed. Thereafter, the print process is terminated. Here, because the print data is encrypted by the common key during SSL communication, the received print data is decrypted and the images represented by the print data are printed.

4.7 Administration PC Main Process

Next, referring to a flow chart shown in FIG. 19, a administration PC main process which is executed by the CPU 21 of the administration PC 20 is described. The administration PC main process is executed every predetermined period of time (for example, once a day).

When the administration PC main process starts, firstly, broadcast for print server search is executed to search for a print server 10 in the LAN 50. Next, at S702, a process to receive returned data in response to the broadcast for print server search is executed at S701. Here, the response data is transmitted at S115 in the above described server main process executed by a CPU of the other print server in the LAN 50 (see FIG. 13).

Then, a loop process (S703-S715) is executed to a print server 10 of which existence is confirmed based on the data received at S702 (each print server 10 in the case that a plurality of print servers exist).

Firstly, a SSL communication request is transmitted to the print server 10 at S703. Thus, SSL handshake is executed between the administration PC 20 and the print server 10. Next, by referring to the server certificate 10c received from the print server 10 at the time of SSL handshake, it is determined whether the issuer (signer) is other than the CA 40 at S704.

Then, if it is determined that the issuer is other than the CA 40 (other print server 10) at S704, the CPU 21 goes to S705, and a CSR create request is transmitted to the print server 10.

Further, CSR parameters are transmitted at S706. Here, the CSR parameters to be transmitted are carried on from the contents of the received server certificate 10c. Thereafter, the CPU 21 goes to S710.

On the other hand, if it is determined that the issuer is not other than the CA 40 (the issuer is the CA 40) at S704, the CPU 21 goes to S707, and it is determined whether a validity period of the certificate expires in predetermined period of time by referring to the server certificate 10c received from the print server 10 at the time of SSL handshake. In the example, it is determined whether the validity period expires in 10 days.

Then, if it is determined that the validity period expires in 10 days at S707, the CPU 21 goes to S708, and the CSR create request is transmitted to the print server 10. Further, CSR parameters are transmitted at S709. Here, the CSR parameters to be transmitted are carried on from the contents of the received server certificate 10c. Thereafter, the CPU 21 goes to S710.

At S710, a process to receive a CSR transmitted from the print server 10 in response to the CSR create request and the CSR parameters transmitted at S705,S706 or S708 and S709 is executed.

Next, at S711, the CSR received at S710 is transmitted to the CA 40. Then, at S712, a process to receive a server certificate 10c transmitted from the CA 40 corresponding to the CSR transmitted at S711.

Next, at S713, the certificate install request is transmitted to the print server 10. Further, at S714, the server certificate 10c received at S712 is transmitted. Thereafter, the CPU 21 goes to S715.

On the other hand, if it is determined that the validity period does not expire in 10 days at S707 (in the case that the server certificate 10c does not need to be updated), the CPU 21 goes directly to S715.

At S715, a SSL disconnect request is transmitted to the print server 10. Thus, the SSL connection between the print server 10 and administration PC 20 is disconnected. Thereafter, the administration PC main process is terminated.

4.8 Host Name/IP Address Change Process

Next, referring to a flow chart shown in FIG. 20, a host name/IP address change process which is executed by the CPU 21 of the administration PC 20 is described. The host name/IP address change process is executed by change operation of the host name or the IP address of the print server 10 on the setup screen 60 displayed on the display device 24 of the administration PC 20 (see FIG. 11).

When the host name/IP address change process starts, firstly, at S801, a SSL communication request is transmitted to the print server 10 of which the host name or the IP address is changed. Thus, SSL handshake is executed between the administration PC 20 and the print server 10.

Next, at S802, by referring to the server certificate 10c received from the print server 10 at the time of SSL handshake, it is determined whether identification information to be changed is used as a common name. That is, it is determined whether the server certificate 10c cannot be used (revoked) after the identification information is changed.

Then, if it is determined that the identification information to be changed is used as a common name at S802 (specifically, if the host name is determined to be used as a common name in the case that the host name is changed, or if the IP address is determined to be used as a common name in the case that the IP address is changed), the CPU 21 goes to S803, and the CSR create request is transmitted to the print server 10.

Further, CSR parameters are transmitted at S804. Here, the CSR parameters to be transmitted are carried on from the contents of the received server certificate 10c. However, a common name is identification information after change. Specifically, the common name is a new host name if the host name is changed, and the common name is a new IP address if the IP address is changed.

Next, at S805, a process to receive a CSR transmitted from the print server 10 in response to the CSR create request and the CSR parameters transmitted at S803,S804 is executed. Next, at S806, the CSR received at S805 is transmitted to the CA 40.

Then, at S807, a process to receive a server certificate 10c transmitted from the CA 40 corresponding to the CSR transmitted at S806. Next, at S803, the certificate install request is transmitted to the print server 10.

Further, at S809, the server certificate 10c received at S807 is transmitted. Thereafter, the CPU 21 goes to S810. On the other hand, it is determined that the identification information to be changed is not used as a common name at S802 (namely, in the case that the server certificate 10c does not need to be updated), the CPU 21 goes directly to S810

At S810, transmit data to request for change of identification information (host name change request or IP address change request) is transmitted to the print server 10. Thus, identification information of the print server 10 (host name or IP address) is changed.

Next, at S811, a SSL disconnect request is transmitted to the print server 10. Thus, the SSL connection between the print server 10 and administration PC 20 is disconnected. Thereafter, the host name/IP address change process is terminated.

5. Effect of the Examples

As described above, the network print system of the example comprises a plurality of print servers 10 that are verified an identify by an authentication device electronically signed by the CA 40 and an administration PC 20 that is configured to be communicatable with the print servers 10 via the LAN 50. The administration PC 20 executes processes to make the CA 40 update the server certificate 10c before the server certificate 10c is revoked (S707-S714, S802-S809). Therefore, in the network print system of the example, when the CA 40 executes an update process of the server certificate 10c of the print server 10, the sever certificate 10c is valid. As a result, the server certificate 10c can be easily updated. That is, in the case that the CA 40 is requested to re-sign (re-issue) the server certificate 10c after the server certificate 10c is revoked, the identity of the print server 10 cannot be verified anymore, and a complicated process is necessary to make the CA 40 verify the print server 10. On the other hand, as for the network print system according to the example, in a situation that the server certificate 10c verifies the identity, the server certificate 10c is updated. Therefore, the server certificate 10c can be easily updated, and widely known certificate authority may be utilized as a CA 40.

Further, by using the network print system, server certificates 10c of a plurality of print servers 10 can be managed by the common administration PC 20 effectively. Particularly, in the network print system of the example, by referring to the validity period of the server certificate 10c of the print server 10, a process to make the CA 40 execute an update process so as to extend the validity period of the server certificate 10c within a predetermined period before the expiration date is executed automatically (S707-S714). Therefore, an administrator of the network print system, etc., need not to be cautious about the validity period of the server certificate 10c, and the network print system can prevent a situation where a validity period of the server certificate 10c expires while the administrator of the communication device is not aware of the expiration Further, by using the network print system of the example, because a process is executed to make the CA 40 update the server certificate 10c of the print server 10 so that the IP address, etc. are changed to new ones (S802-S809) before the IP address or the host name of the print server 10 is changed, the network print system can prevent a situation where the server certificate 10c is revoked because IP address, etc., of the print server 10 is changed. Then, the network print system can prevent a situation where secure communication cannot established temporarily in the case that the host name of the print server 10 is changed, for example, because of mistakes of the administrator.

On the other hand, in the network print system of the example, each print server 10 is configured to execute a process to update the server certificate 10c with an own electronic signature, if the print server 10 is requested to update the server certificate 10c from other print server 10 (S118: YES). Then, each print server 10 executes a process to request other print server of which identity is verified by the CA 40 for updating the own server certificate 10c before the server certificate 10c is revoked, if it is determined that a process to make the CA 40 update the own server certificate 10c is not executed by the administration PC 20 (S107: YES). Therefore, in the network print system of the example, because the print server 10 of which the server certificate 10c is updated by the other print server 10 is verified the identity by the CA 40 indirectly, even if the administration PC 20 does not execute the process to make the CA 40 to update the server certificate 10c (for example, due to malfunction of the administration PC 20), the network print system can prevent the situation where the server certificate 10c is immediately revoked. Further, in the network print system of the example, the administration PC 20 is configured to execute a process to make the CA 40 update the server certificate 10c (S704-S706, S710-S714), if it is determined that the server certificate 10c of the print server 10 is not electronically signed by the CA 40. Therefore, high reliability of the print server 10 can be achieved.

6. Other Examples

In the above, the examples of the present invention have been described. An example of the invention is not limited to the above examples. According to the claims of the invention, various examples may be realized.

For example, in the network print system of the above described example, the administration PC main process (see FIG. 19) for managing the server certificate 10c of each print server 10 is automatically executed every predetermined period of time (for example, once a day). The administrator of the network print system may execute at any time, not periodically. However, the administrator may forget to execute the process, and so it is preferable that the process is executed automatically.

In the network print system of the example, the server certificate 10c is automatically updated. However, the server certificate 10c may be updated in other way, for example, if the server certificate 10c needs to be updated, confirmation of the administrator is required (for example, using a dialog box displayed on the display device 24 of the administration PC 20), and the update process of the server certificate 10c may be executed depending the confirm result.

Further, in the network print system of the above described example, the CA 40 in the LAN 50 issues the server certificate 10c of the print server 10. However, for example, a CA may be utilized in the Internet. Further, the administration PC 20 may be configured to comprise the CA (the administration PC 20 may have an electronic signature function as a CA).

On the other hand, in the network print system of the above described example, the administration PC 20 executes the process to update the server certificate 10c of each print server 10. However, if the print server 10 executes the update process of the own server certificate 10c (directly requests the CA 40 to execute the update process of the server certificate 10c), the system may be configured without an administration PC 20.

Further, in the network print system of the example, in the case that the server certificate 10c is not updated by the administration PC 20, although the server certificate 10c should be updated by the administration PC 20, the print server 10 which executes the alternative signing request process (see FIG. 15) to request other print server 10 in the LAN 50 for generating the server certificate 10c is utilized. However, the system may be configured using print servers which do not execute the alternative signing request process.

What is claimed is:

1. A communication system comprising:
   a communication device configured to be verified and identified by an authentication device with electronically signed public key certificate;

a certificate update device comprising:
- a transmission unit configured to transmit a request for transmitting the public key certificate to the communication device;
- a receiving unit configured to receive the public key certificate transmitted from the communication device;
- a controller configured to determine, based on the public key certificate transmitted from the communication device, whether, when identification information of the communication device is to be changed, the public key certificate is revoked after the identification information is changed; and
- a certificate update unit configured to execute a process to instruct the authentication device to update the public key certificate of the communication device before a public key certificate would be revoked after the identification information is changed; and
- an information change unit that changes identification information of the communication device,
- wherein the public key certificate of the communication device contains identification information of the communication device that is holder information, and
- wherein the certificate update unit is configured to execute the process to instruct the authentication device to update the public key certificate so that the holder information is changed to be new identification information before the information change unit changes the identification information of the communication device to the new identification information.

2. The communication system according to claim 1, further comprising:
- a plurality of the communication devices; and
- an administration device configured to be communicatable with each of the plurality of the communication devices,
- wherein each of the communication devices comprises:
  - storage configured to store a public key certificate electronically signed by the authentication device to verify an identity of the communication device; and
  - a data transmission unit configured to transmit the public key certificate to the administration device in response to a request from the administration device, and
- the administration device comprises the certificate update device, which is configured to execute the process to instruct the authentication device to update the public key certificate for each of the plurality of the communication devices.

3. The communication system according to claim 2, wherein the communication device comprises:
- an alternate update request unit configured to execute a process to send a request to another communication device of which identity is verified by the authentication device for updating the public key certificate before a public key certificate is revoked when it is determined that the process to instruct the authentication device to update the public key certificate of the communication device is not executed by the administration device; and
- an alternate update process unit configured to execute an alternate update process to update the public key certificate with an electronic signature of the communication device when the communication device receives a request to update a public key certificate from another communication device.

4. The communication system according to claim 3, wherein the certificate update unit of the administration device executes a process to instruct the authentication device to update the public key certificate when it is determined that the public key certificate of the communication device is not electronically signed by the authentication device.

5. A certificate update device for a communication system comprising a communication device of which identity is verified by a public key certificate electronically signed by an authentication device, the certificate update device configured to execute a process to instruct the authentication device to update the public key certificate of the communication device before a public key certificate of the communication device is revoked, the certificate update device comprising:
- a request transmission unit configured to transmit a request for transmitting the public key certificate to the communication device;
- a receiving unit configured to receive the public key certificate transmitted from the communication device when an operation to change identification information of the communication device is made by a user;
- a controller configured to determine, based on the public key certificate transmitted from the communication device, whether, when identification information of the communication device is to be changed, the public key certificate is revoked after the identification information is changed; and
- an instruction transmission unit configured to transmit an instruction to the communication device to request a change of the identification information of the communication device in response to the update of the public key certificate in the communication device,
- wherein the controller is configured to make the communication device to update the public key certificate to a new public key certificate when the identification information to be changed by the user operation is used as holder information included in the public key certificate received by the receiving unit.

6. A communication device of which identity is verified by a public key certificate electronically signed by an authentication device, the public key certificate of the communication device including holder information of the communication device as one of first identification information and second identification information, the communication device comprising:
- a microprocessor;
- an instruction receiving unit configured to receive an instruction to change the first identification information;
- an information changing unit configured to change the first identification information in response to the instruction received by the instruction receiving unit;
- an obtaining unit configured to obtain holder information included in the public key certificate of the communication device in response to the instruction received by the instruction receiving unit, the communication device being subject to change the first identification information by the instruction; and
- a certificate update unit configured to make the authentication device update the public key certificate so that the holder information of the public key certificate is changed in accordance with the instruction when the holder information obtained by the obtaining unit is the first identification information,
- wherein, when the holder information obtained by the obtaining unit is the first identification information, the information changing unit changes the first identification information after the public key certificate has been updated by the certificate update unit.

7. A non-transitory storage medium storing a program to be executed by a certificate update device communicatable with a communication device via a network, the program comprising instructions causing the certificate update device to execute:
- an accepting process to accept an operation by a user through an operation unit of the certificate update device to change identification information of the communication device from first identification information to second identification information, the identification information being information to identify the communication device on the network when the communication device communicates with a device on the network;
- a receiving process to receive a public key certificate of the communication device from the communication device;
- an install process to cause the communication device to install a new public key certificate, in which the second identification information is included as holder information, when the first identification information is included in the received public key certificate as holder information; and
- a transmitting process to transmit an instruction to change the identification information from the first identification information to the second identification information to the communication device when the new public key certificate is installed in the communication device,
- wherein when the first identification information is not included in the received public key certificate as holder information, the instruction to change the identification information from the first identification information to the second identification information is transmitted to the communication device without causing the communication device to install the new public key certificate.

8. The non-transitory storage medium according to claim 7, wherein the program further comprising instructions causing the certificate update device to execute:
- a generating process to generate a CSR ("Certificate Signature Request"), in which the first identification information of a plurality pieces of information included in the received public key certificate is changed to the second identification information;
- a CSR transmitting process to transmit the generated CSR to an authentication device; and
- a new certificate receiving process to receive the new public key certificate from the authentication device, the new public key certificate being generated based on the CSR from the certificate authority, and
- wherein, the new public key certificate received from the authentication device is transmitted to the communication device to cause the communication device to install the new public key certificate.

9. The non-transitory storage medium according to claim 7, wherein the public key certificate of the communication device is received from the communication device by transmitting a request for SSL communication to the communication device.

* * * * *